United States Patent
Burkey et al.

(10) Patent No.: US 11,630,073 B2
(45) Date of Patent: Apr. 18, 2023

(54) SYSTEM AND METHOD FOR UNDERGROUND WIRELESS SENSOR COMMUNICATION

(71) Applicant: REALMFIVE, Inc., Lincoln, NE (US)

(72) Inventors: Brant Burkey, Denton, NE (US); Steve R. Tippery, Gretna, NE (US); Tim Adkins, Plattsmouth, NE (US); Jochen Pfrenger, The Woodlands, TX (US); Dan Pickerill, Milford, NE (US)

(73) Assignee: REALMFIVE, INC., Lincoln, NE (US)

( * ) Notice: Subject to any disclaimer, the term of this patent is extended or adjusted under 35 U.S.C. 154(b) by 0 days.

(21) Appl. No.: 17/525,617

(22) Filed: Nov. 12, 2021

(65) Prior Publication Data

US 2022/0074881 A1   Mar. 10, 2022

Related U.S. Application Data

(63) Continuation of application No. 16/215,261, filed on Dec. 10, 2018, now Pat. No. 11,231,383.
(Continued)

(51) Int. Cl.
*G01N 27/22* (2006.01)
*G01D 21/02* (2006.01)
(Continued)

(52) U.S. Cl.
CPC .......... *G01N 27/223* (2013.01); *G01D 21/02* (2013.01); *H04L 67/12* (2013.01); *H04L 67/568* (2022.05); *H04W 84/20* (2013.01)

(58) Field of Classification Search
None
See application file for complete search history.

(56) References Cited

U.S. PATENT DOCUMENTS 5,442,293 A * 8/1995 Lange .................. G01N 27/223
                                                      324/696
6,388,453 B1   5/2002 Greer
(Continued)

FOREIGN PATENT DOCUMENTS

KR   20160107977 A   9/2016
WO   2017185134 A1   11/2017

OTHER PUBLICATIONS

International Search Report and Written Opinion dated Apr. 25, 2019 for PCT/US2018/064772.

*Primary Examiner* — Paul M. West
*Assistant Examiner* — Mark A Shabman
(74) *Attorney, Agent, or Firm* — Suiter Swantz pc llo

(57) ABSTRACT

A sensor system for collecting data regarding sub-surface material characteristics may include a multitude of sensor nodes, a data gateway, and a controller. Each sensor node may include a power supply and a communication device and the multitude of sensor nodes may include sensors distributed between underground sensor nodes and/or partially-exposed sensor nodes to collect data regarding sub-surface material characteristics. The data gateway may be coupled with any combination of the sensor nodes through wireless transmission data pathways and may receive and store at least some of the data collected by the one or more sensors. The controller may receive the data generated by the one or more sensors from the data gateway and display at least a portion of the data.

26 Claims, 23 Drawing Sheets

Related U.S. Application Data

(60) Provisional application No. 62/596,444, filed on Dec. 8, 2017.

(51) Int. Cl.
*H04W 84/20* (2009.01)
*H04L 67/12* (2022.01)
*H04L 67/568* (2022.01)

(56) References Cited

U.S. PATENT DOCUMENTS

| | | | |
|---|---|---|---|
| 8,035,403 B1 * | 10/2011 | Campbell | G01N 33/24 |
| | | | 324/694 |
| 8,354,852 B1 | 1/2013 | Campbell et al. | |
| 8,368,529 B1 | 2/2013 | Campbell et al. | |
| 8,374,553 B1 | 2/2013 | Campbell et al. | |
| 8,565,927 B1 | 10/2013 | Campbell et al. | |
| 8,682,493 B1 | 3/2014 | Campbell et al. | |
| 9,532,118 B2 * | 12/2016 | Vuran | G01S 13/885 |
| 9,829,869 B2 * | 11/2017 | Ersavas | G05B 15/02 |
| 9,872,445 B2 * | 1/2018 | Cline | G06Q 50/02 |
| 9,949,450 B2 * | 4/2018 | Richings, Sr. | A01G 25/167 |
| 2009/0007706 A1 * | 1/2009 | Hitt | A01G 25/167 |
| | | | 73/866 |
| 2009/0168678 A1 * | 7/2009 | Han | H04W 52/0225 |
| | | | 370/311 |
| 2009/0302870 A1 * | 12/2009 | Paterson | G01N 33/24 |
| | | | 324/670 |
| 2011/0035059 A1 * | 2/2011 | Ersavas | A01G 25/167 |
| | | | 455/466 |
| 2013/0207771 A1 * | 8/2013 | Ersavas | G05B 19/0426 |
| | | | 340/3.1 |
| 2015/0366149 A1 * | 12/2015 | Canyon | A01G 25/167 |
| | | | 700/284 |
| 2016/0029568 A1 * | 2/2016 | Anjum | G05B 15/02 |
| | | | 702/2 |
| 2016/0183484 A1 | 6/2016 | Richings et al. | |
| 2016/0255763 A1 * | 9/2016 | Canyon | A01B 79/005 |
| 2019/0187086 A1 | 6/2019 | Burkey et al. | |

* cited by examiner

SYSTEM AND METHOD FOR UNDERGROUND WIRELESS SENSOR COMMUNICATION

CROSS-REFERENCE TO RELATED APPLICATION

The present application claims priority to the benefit of U.S. patent application Ser. No. 16/215,261 filed Dec. 10, 2018 entitled SYSTEM AND METHOD FOR UNDERGROUND WIRELESS SENSOR COMMUNICATION, which claims priority to U.S. Provisional Application Ser. No. 62/596,444, filed Dec. 8, 2017, entitled COMMUNICATIONS AND DATA PLATFORM FOR UNDERGROUND WIRELESS SENSOR, naming Brant Burkey, Steve R. Tippery, Tim Adkins, and Jochen Pfrenger as inventors, which is incorporated herein by reference in the entirety.

TECHNICAL FIELD

The present invention generally relates to material sensors, and, more particularly, to a system of sub-surface material sensors.

BACKGROUND

In a wide range of industries, from agricultural industries, turf care industries, to construction and commodity storing industries, it may be desirable to determine characteristics of a material not only on the surface of the material, but below the surface as well. Accordingly, buried and/or sub-surface sensors are sometimes used to obtain one or more measurements regarding sub-surface characteristics and conditions. These sub-surface sensors may be desirable when obtaining measurements of sub-surface characteristics is not otherwise feasible and/or easily conducted. However, previous sub-surface sensor systems have faced a number of limitations and drawbacks.

First, the range of effective data transmission may be decreased when transmitting data through a material or medium, such as soil. Accordingly, previous sub-surface sensor systems typically utilize sub-surface sensors which are installed with a wired component which is at least partially above ground in order to overcome data transmission and power supply issues. However, above-ground sensor components run the risk of interfering with above-ground operations (e.g., planting, tilling, spraying, harvesting, and the like) and damaging equipment (e.g., harvesting equipment, irrigation equipment, spraying equipment, and the like), which result in expensive equipment damage.

Second, sub-surface sensors have previously only been able to be utilized in temporary applications (e.g., applications typically lasting less than one year) or semi-permanent applications (e.g., applications typically lasting 2-3 years or less). Operational requirements, such as energy supply requirements and sensor durability characteristics, result in previous sub-surface sensors to be incompatible with permanent applications in seasonal crop applications such as corn, soybeans, wheat, etc. As such, previous sub-surface sensor systems require the sub-surface sensors to be removed on a regular, seasonal, or semi-regular basis.

Similarly, sub-surface sensors currently run the risk of being damaged during field operations. Accordingly, current sub-surface sensors must be removed from the ground not only for power supply limitations, but to avoid being damaged during field operations. For example, a sub-surface sensor may have to be placed in the ground after tillage and planting operations, but removed before harvesting operations in order to avoid being damaged during the course of the operations. This periodic cycle of sub-surface sensor installation and removal results in high annual labor installation and removal costs.

Furthermore, previous sub-surface sensor systems communicatively couple each of the sub-surface sensors to a data processing or communications module. This connectivity configuration results in high, recurring data transmission costs. These previous configurations result in high unit costs per each sub-surface sensor, leading to high system costs which pose barriers-to-entry to individuals and businesses who would otherwise install more valuable remote sensing equipment. Furthermore, using this configuration, there is no way to increase the number of sub-surface sensors within the system without also increasing the cost of recurring data transmission.

Therefore, it would be desirable to provide a system and method which cure one or more of the shortfalls of the previous approaches identified above.

SUMMARY

A system is disclosed in accordance with one or more illustrative embodiments of the present disclosure. In one illustrative embodiment, the system includes a multitude of sensor nodes, each sensor node including a power supply and a communication device. In another illustrative embodiment, the multitude of sensor nodes includes one or more underground sensor nodes positioned below the surface of a material distributed between any combination of partially-exposed sensor nodes or underground sensor nodes. In another illustrative embodiment, the system includes a data gateway communicatively coupled to at least some of the sensor nodes via one or more wireless transmission pathways, where the data gateway receives and stores the data collected by the sensors. In another illustrative embodiment, the system includes a controller to receive the data from the sensors from the data gateway and display at least a portion of the data associated with at least one of the one or more sub-surface material characteristics.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
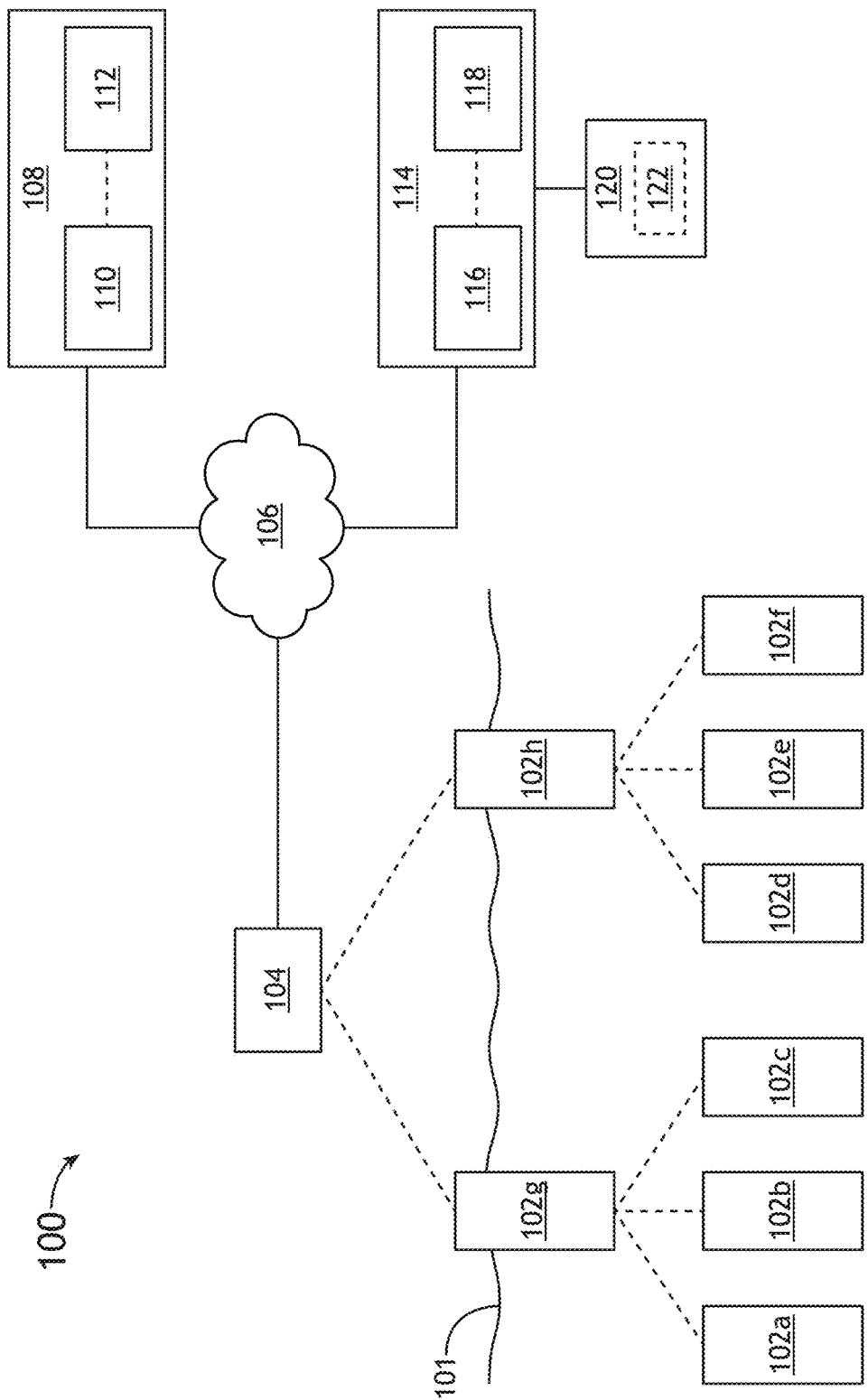
FIG. 1A illustrates a simplified block diagram of a sub-surface sensor system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Buried and/or submerged sensors are sometimes used to obtain one or more measurements regarding sub-surface material characteristics, such as sub-surface moisture levels, temperature, and/or chemical characteristics. However, previous sub-surface sensor systems have suffered from a number of limitations. Previous sub-surface sensor systems typically utilize sub-surface sensors which are installed with a wired component which is at least partially above ground in order to overcome power supply issues and difficulties in data transmission through ground. For example, previous sub-surface sensors are typically wired to an above-ground power supply. Above-ground power supplies may include solar panels, wind turbines, electrical generators, and/or batteries. The power supplies of the sub-surface sensors are typically installed above ground so that the power supplies may be easily repaired and/or replaced. Furthermore, current sub-surface sensors require significant power outputs and exhibit high power consumptions, causing them to require large power supplies. These above-ground sensor components and power supplies run the risk of interfering with above-ground operations (e.g., planting, tilling, spraying, irrigating, harvesting, and the like), as well as damaging equipment (e.g., harvesting equipment, irrigation equipment, spraying equipment, and the like).

Another limitation of previous sub-surface sensor systems is the required periodic installation and removal of each sub-surface sensor. Previously, there has been no efficient method of providing power to sub-surface sensors which does not also interfere with above-ground operations. Furthermore, sub-surface sensors currently run the risk of being damaged during field operations. These two limitations, taken together, result in sub-surface sensors to be compatible with only temporary or semi-permanent applications. For example, current sub-surface sensors may have to be periodically removed in order to be repaired and/or charged. Additionally, current sub-surface sensors must be removed to avoid being damaged during field operations, such as planting, tilling, spraying, irrigating, and harvesting operations. This periodic cycle of sub-surface sensor installation and removal results in high annual labor costs. In this same regard, extended periods of time as well as lost or missing location markers often cause difficulties in locating and removing sub-surface sensors. These difficulties may be the result of field operations, earth movements, flooding, and the like. Not only do these difficulties further increase annual labor costs, but lost sub-surface sensors, including batteries, may pose environmental concerns if they are not removed from the ground.

Furthermore, previous sub-surface sensor systems often communicatively couple each of the sub-surface sensors to a data processing or communications module. This is partially due to the limited capability of current sub-surface sensor systems to effectively penetrate soil and other biomass in order to transmit data below ground. This connectivity configuration results in high, recurring data transmission costs. These previous configurations result in high unit costs per each sub-surface sensor, leading to extremely high system costs which pose barriers-to-entry to would-be entrants. Furthermore, using this configuration, there is no way to increase the number of sub-surface sensors within the system without also increasing the cost of recurring data transmission.

Accordingly, embodiments of the present disclosure are directed to a system of sub-surface sensors which utilize one or more sensor nodes to communicatively couple the sub-surface sensor nodes to an above-ground data gateway. Additional embodiments of the present disclosure are directed to a system which utilizes wireless data transmission to transmit data below ground between sub-surface sensor nodes. Additional embodiments of the present disclosure are directed to the use of a data gateway configured to communicatively couple to a subset of sub-surface sensors of a plurality of sub-surface sensors in order to reduce recurring data transmission costs. Further embodiments of the present disclosure are directed to capacitive probes to more efficiently and effectively measure sub-surface moisture levels in a sub-surface sensor node system.

Reference will now be made in detail to the subject matter disclosed, which is illustrated in the accompanying drawings.

Referring generally to FIGS. 1A-15, a system and method for collecting data associated with one or more sub-surface characteristics of a material are disclosed, in accordance with one or more embodiments of the present disclosure.

FIG. 1A illustrates a simplified block diagram of a sub-surface sensor system 100, in accordance with one or more embodiments of the present disclosure. System 100 may include, but is not limited to, one or more sensor nodes 102, a data gateway 104, a network 106, a server 108, a controller 114, and a user interface 120.

In one embodiment, the one or more sensor nodes 102 may be positioned below the surface 101 of a material and configured to measure and/or collect data regarding one or more sub-surface material characteristics. For example, as shown in FIG. 1A, sensor nodes 102a, 102b, 102c, 102d, 102e, and 102f may be positioned under the surface 101 of the ground (e.g., buried within the soil). The one or more sub-surface material characteristics may include, but are not limited to, moisture levels, electroconductivity levels, temperatures, chemical compositions, pressures, nutrient levels, and the like. For example, system 100 may be implemented in an agricultural setting, in which the one or more sub-surface sensor nodes 102 are buried within agricultural fields and configured to measure sub-surface soil characteristics, including soil moisture levels, soil electroconductivity levels, soil temperatures, nutrient levels, gases, particulate constituents, biological pathogens, pH, and the like.

As will be described in further detail herein, it is contemplated herein that the sensor nodes 102 of the present disclosure may be implemented in a wide variety of contexts, and may be used to measure sub-surface characteristics of any material. For example, sensor nodes 102 may be configured to measure sub-surface material characteristics of soil, liquids (e.g., water, oil, liquid fertilizer), volumes of commodities (e.g., potatoes, corn, grain, wheat, and the like), biomass, landfill material, concrete, bulk storage materials (e.g., dry fertilizer, salt, sand, gravel, and the like) and the like. In this regard, although system 100 may be described as being implemented in an agricultural context, this is solely for illustrative purposes, and is not to be regarded as a limitation of the present disclosure, unless noted otherwise herein.

It is contemplated herein that the sub-surface sensor nodes (e.g., sensor nodes 102a, 102b, 102c, 102d, 102e, and 102f) may be positioned below the surface 101 a sufficient depth in order to avoid being damaged by equipment or operations, such as tilling equipment, planting equipment, harvesting equipment, and the like. In this regard, sensor nodes 102 may be installed below relevant operating depths of equipment which may be operating within the same area as system 100. It is further contemplated herein that the sub-surface sensor nodes 102a-102f may be positioned below the surface 101 at a depth which allows for reliable data transmission to components above the surface 101 of the material (e.g., sensor nodes 102g, 102h, data gateway 104, and the like).

For the purposes of the present disclosure, sensor nodes 102 which are positioned completely below the surface 101 of a material (e.g., sensor nodes 102a-102f) may be referred to as "sub-surface sensor nodes 102." Conversely, sensor nodes 102 which are positioned partially or completely above the surface 101 of a material (e.g., sensor nodes 102g, 102h) may be referred to as "surface sensor nodes 102."

In another embodiment, the one or more sub-surface sensor nodes 102a-102f may be configured to store collected data in memory. In another embodiment, the one or more sub-surface sensor nodes 102a-102f may be configured to transmit collected and stored data to an additional sensor node 102. For example, as shown in FIG. 1A, sub-surface sensor nodes 102a, 102b, 102c and sub-surface sensor nodes 102d, 102e, 102f may be configured to transmit collected and stored data to sensor node 102g and sensor node 102h, respectively. The sub-surface sensor nodes 102a-102f may be configured to transmit data to surface sensor nodes 102g, 102h using any type of wireless communication technique known in the art including, but not limited to, radio frequency (RF) protocols, Bluetooth protocols, GSM, GPRS, DCMA, EV-DO, EDGE, WiMAX, 4G, 4G LTE, 5G, 6G, WiFi protocols, RF, LoRa, and the like. By way of another example, sub-surface sensor nodes 102a-102f may be configured to transmit data to surface sensor nodes 102g, 102h using ZigBee, SigFox, NB-IOT, and the like.

For example, sub-surface sensor nodes 102a-102f may be configured to transmit data to surface sensor nodes 102g, 102h using LoRa. LoRa wireless radio technology is often used to transmit small amounts of data over longer distances. It is noted herein that LoRa radio technology has been found to provide reliable long-distance data transmission even in conditions which would ordinarily pose issues using other data transmission techniques. For instance, agricultural crop canopies, such as corn, may strongly absorb radio waves, leading to poor RF transmission in such conditions. On the other hand, LoRa has been found to provide reliable long-distance transmissions in such conditions. These characteristics of LoRa may make LoRa a good candidate for data transmission in sub-surface environments, such as system 100. However, it is noted herein that LoRa wireless radio technology is often used to transmit small amounts of data over longer distances, but may be inappropriate to wirelessly transmit large amounts of data. As such, alternative wireless data transmission techniques may be required in systems which require large amounts of data transmission.

In another embodiment, surface sensor node 102g and surface sensor node 102h may be configured to store data received by sub-surface sensor nodes 102a, 102b, 102c, and sub-surface sensor nodes 102d, 102e, and 102f, respectively. Furthermore, surface sensor nodes 102g, 102h may be configured to measure and/or collect data regarding one or more sub-surface material characteristics.

As noted previously herein, the wireless data transmission below ground may be limited by technical and environmental factors. The efficiency and range of wireless data transmission may be significantly decreased when transmitting data below the surface of a material. Particularly, it is noted herein that radio and other waves may be absorbed by biomass, such as soil, crops, foliage, and the like. Furthermore, sub-surface material may obstruct the efficient transmission of data. In this regard, in another embodiment, surface sensor nodes 102g, 102h may be positioned such that at least a portion of the surface sensor nodes 102g, 102h is positioned above the surface 101 of the material. By positioning at least a portion of surface sensor nodes 102g, 102h above the surface 101 of the material, the effective data transmission range of sensor nodes 102g, 102h may be significantly improved. It is further noted herein that the ability of surface sensor nodes 102g, 102h to receive, store, and transmit data collected by the sub-surface sensor nodes 102a-102f (e.g., "store-and-forward") may allow the surface sensor nodes 102g, 102h to effectively increase the data transmission range of the sub-surface sensor nodes 102a-102f. For the purposes of the present disclosure, the sensor nodes 102g, 102h may be said to function as "repeaters" and/or "store-and-forward sensor nodes" in that they are configured to receive data from other sensor nodes 102, store the received data, and transmit the stored data to other components in system 100.

In one embodiment, sensor nodes 102g, 102h are configured to transmit stored data to data gateway 104. The sensor nodes 102g, 102h may be communicatively coupled to data gateway 104 using any wired or wireless communication technique known in the art including, but not limited to, ZigBee, SigFox, NB-IOT, radio frequency (RF) protocols, Bluetooth protocols, GSM, GPRS, DCMA, EV-DO, EDGE, WiMAX, 4G, 4G LTE, 5G, 6G, WiFi protocols, RF, LoRa, and the like.

It is noted herein that the configuration of system 100 with one or more sub-surface sensor nodes 102 (e.g., sensor nodes 102a-102f) transmitting collected and stored data to one or more surface sensor nodes 102 (e.g., sensor nodes 102g, 102h) may provide a number of advantages over prior approaches. First and foremost, transmitting data from sub-surface sensor nodes 102a-102f to surface sensor nodes 102g, 102h may effectively increase the data transmission range of the sub-surface sensor nodes 102a-102f. Secondly, embodiments which utilize multiple sub-surface sensor nodes 102 to each surface sensor node 102g, 102h may minimize the amount of equipment and components which may be susceptible to damage by above-ground operations. For example, by minimizing the number of surface sensor nodes 102g, 102h, system 100 may effectively minimize the number of surface sensor nodes 102g, 102h which may be damaged by planting equipment, tilling equipment, irrigation equipment, spraying equipment, harvesting equipment, and the like. By burying sub-surface sensor nodes 102a-102f below the surface 101 a sufficient depth, system 100 may effectively reduce the amount of equipment which is susceptible to damage through ordinary operations.

An additional advantage associated with system 100 is the reduction in the amount of above-ground equipment, and therefore the reduction of annual labor costs. As noted previously herein, above-ground components may have to be removed before various operations can take place. For example, above-ground sensors may have to be removed prior to tilling, planting, and harvesting operations. However, utilizing system 100, the number of components (e.g., surface sensor nodes 102g, 102h) which are positioned above the surface 101 may be minimized, thereby minimizing the number of components which must be removed prior to operations on a regular or semi-regular basis. This reduction may be translated into fewer man hours required to remove equipment prior to operations, lower installation and removal costs, and thus lower annual labor costs. This effectively reduces the annual operating cost of each individual sensor node 102.

Another advantage provided by the configuration of system 100 is the reduction of recurring data transmission costs. As noted previously herein, previous systems communicatively couple each sub-surface sensor directly to a data processing or communications module. This repetitive data transmission results in recurring and repetitive data transmission costs. By communicatively coupling a subset of sensor nodes 102 of system 100 to the data gateway 104 (e.g., sensor nodes 102g, 102h), wherein the subset of sensor nodes 102 are communicatively coupled to additional sensor nodes 102 (e.g., sub-surface sensor nodes 102a-102f), system 100 may effectively reduce recurring data transmission costs associated with transmitting data to the data gateway 104 and network 106.

The ability of surface sensor nodes 102g, 102h to receive and store data from sub-surface sensor nodes 102a-102f may also improve overall data transmission efficiency. For example, obstructions or environmental conditions, such as rain, snow, construction equipment, farming equipment, and the like, may impair the data transmission efficiency between the surface sensor nodes 102g, 102h and the data gateway 104. In this regard, when the surface sensor nodes 102g, 102h are out of range from the data gateway 104 or otherwise unable to transmit data to the data gateway 104, the surface sensor nodes 102g, 102h may be configured to store in memory data collected by the surface sensor nodes 102g, 102h and data received from the sub-surface sensor nodes 102a-102f. When the data gateway 104 is in range or the surface sensor nodes 102g, 102h are otherwise able to transmit data efficiently, the surface sensor nodes 102g, 102h may be configured to transmit the data stored in memory.

In an additional and/or alternative embodiment, sensor nodes 102g, 102h may comprise only store-and-forward components. For example, sensor nodes 102g, 102h may be configured to receive data collected by sensor nodes 102a-102f, store received data, and forward stored data to the data gateway 104. In this example, sensor nodes 102g, 102h may not include any sensors which are configured to cause sensor nodes 120g, 102h to collect data on their own.

In another embodiment, the data gateway 104 of system 100 is configured to receive data from one or more sensor nodes 102 (e.g., sensor node 102g, 102h) and store the data in memory. In another embodiment, the data gateway 104 may be configured to transmit received and stored data to a network 106. As noted previously, the data gateway 104 may be configured to store data in memory when the data gateway 104 is unable to transmit data, and subsequently transmit the stored data when the data gateway 104 becomes communicatively coupled to network 106. The data gateway 104 may be configured to transmit data to network 106 using any type of wireless communication technique known in the art including, but not limited to, radio frequency (RF) protocols, Bluetooth protocols, GSM, GPRS, DCMA, EV-DO, EDGE, WiMAX, 4G, 4G LTE, 5G, 6G, WiFi protocols, RF, LoRa, and the like. In this regard, data gateway 104 may include any network interface known in the art configured to communicatively couple the data gateway 104 to the network 106. In one embodiment, network 106 may comprise a cloud-based network configuration.

In another embodiment, the network 106 is configured to transmit data received from the sensor nodes 102 to a server 108. The server 108 may include one or more processors 110 and a memory 112. It is contemplated herein that the server 108 may comprise a remote server configured to carry out one or more of the steps of the present disclosure. In one embodiment, server 108 may include a cloud-based computing platform including, but not limited to, Amazon Web Services (AWS). In one embodiment, one or more processors 110 of server 108 may be configured to store the received data in memory 112. The one or more processors 110 may be further configured to execute a set of program instructions stored in memory 112, the program instructions configured to cause the one or more processors 110 to carry out one or more steps of the present disclosure.

For example, the data collected by the sensor nodes 102 may be transmitted to server 108 via network 106. The one or more processors 110 may be configured to time-stamp and store received data in memory 112. The one or more processors 110 may be further configured to filter and sort stored data. The one or more processors 110 may be further configured to perform one or more operations on received and stored data. For example, as will be discussed in greater detail herein, the sensor nodes 102 may include capacitive moisture sensors which measure material moisture levels based on calculated capacitance levels. In this regard, the one or more processors 110 may be configured to receive capacitance level readings from the sensor nodes 102 and calculate material moisture levels based on the received capacitance level readings. The one or more processors 110 may then be further configured to store calculated moisture levels in memory 112.

In another embodiment, system 100 includes a controller 114 communicatively coupled to the server 108 via network 106. The controller 114 may be configured to receive data collected by the sensor nodes 102 via the network 106. The controller 114 may be further configured to receive data generated and/or stored by the server 108 via network 106. In this regard, the controller 114 may include a network interface configured to communicatively couple the controller 114 to the network 106. In one embodiment, the controller 114 includes one or more processors 116 and a memory 118. In another embodiment, the one or more processors 116 may be configured to execute a set of program instructions stored in memory 118, wherein the set of program instructions are configured to cause the one or more processors 116 to carry out the steps of the present disclosure.

For example, the data collected by the sensor nodes 102 may be transmitted to controller 114 via network 106. The one or more processors 116 may be configured to time-stamp and store received data in memory 118. The one or more processors 116 may be further configured to filter and sort stored data. The one or more processors 116 may be further configured to perform one or more operations on received and stored data. It is noted herein that the discussion herein regarding server 108, one or more processors 110, and memory 112 may also be regarded as applying to controller 114, one or more processors 116, and memory 118, unless noted otherwise herein. In this regard, any steps of functions carried out by the server 108 may additionally and/or alternatively be carried out by the controller 114, unless noted otherwise herein.

It is further noted herein that the one or more components of system 100 may be communicatively coupled to the various other components of system 100 in any manner known in the art. For example, the server 108, controller 114, one or more processors 110, 116, and memory 112, 118 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth, 3G, 4G, 4G LTE, 5G, 6G, and the like).

In one embodiment, system 100 may include a user interface 120 communicatively coupled to the controller 114. In one embodiment, the user interface 120 includes a display 122 used to display data of the system 100 to a user. The display 122 of the user interface 120 may include any display known in the art. For example, the display may include, but is not limited to, a liquid crystal display (LCD), an organic light-emitting diode (OLED) based display, or a CRT display. Those skilled in the art should recognize that any display 122 device capable of integration with a user interface 120 is suitable for implementation in the present disclosure. In another embodiment, a user may input selections and/or instructions responsive to data displayed to the user via the user interface 120.

In another embodiment, the user interface 120 may include, but is not limited to, one or more desktops, laptops, tablets, smartphones, smart watches, or the like. In one embodiment, a user may use the user interface 120 in order to view data collected by the sensor nodes 102, generated by the one or more processors 110, 116, or stored in memory 112, 118. In another embodiment, the user interface 120 may be configured one or more input commands from a user, wherein the one or more input commands are configured to cause one or more processors to adjust one or more characteristics of system 100.

For example, one or more processors 110, 116 may be configured to transmit one or more alerts to a user, wherein the user interface 120 is configured to display the one or more alerts to the user via the display 122. For example, the one or more processors 110, 116 may be configured to transmit one or more alerts to a user indicating a low moisture level in a section of a field. The one or more alerts generated by system 100 and displayed via display 122 may include any alert known in the art including, but not limited to, automated phone calls, text messages, emails, application notifications, banners, push notifications, and the like.

By way of another example, a farm owner may desire to view temperatures and moisture levels of the soil at various points throughout the farm. It is noted herein that the ability to view soil characteristics (e.g., temperature, moisture levels, electroconductivity levels, and the like) at various points throughout a farm may allow a farm owner or operator to adjust one or more farm characteristics or farming operating parameters in order to more effectively and efficiently operate the farm. For instance, based on moisture levels collected, stored, and displayed to a farm owner via display 122, a farm owner may be able to modify irrigation times, irrigation volumes, fertilizer types, and the like in order to optimize crop growth.

Figure 1B:
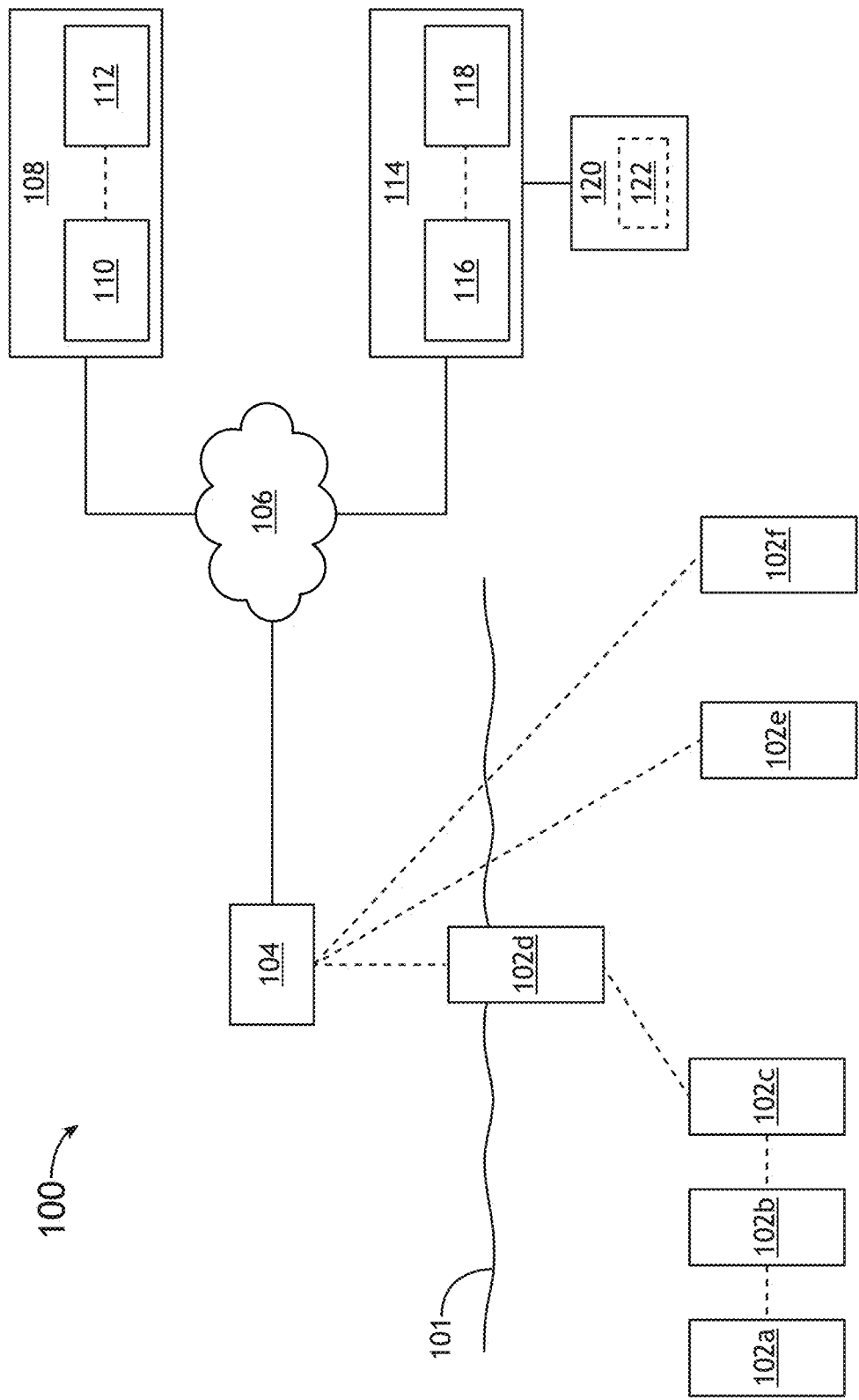
FIG. 1B illustrates a simplified block diagram of a simplified block diagram of a sub-surface sensor system, in accordance with one or more embodiments of the present disclosure.
Figure 1C:
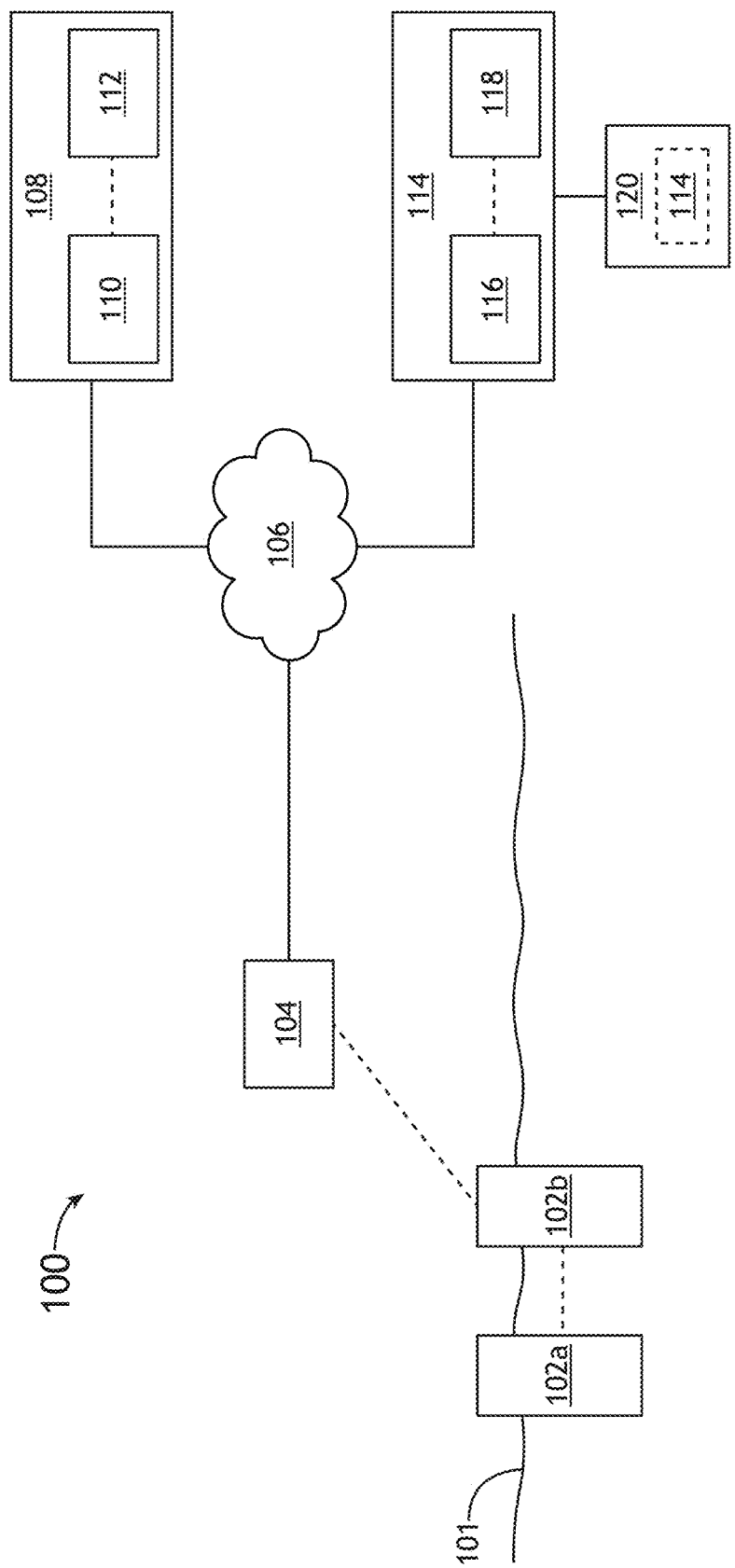
FIG. 1C illustrates a simplified block diagram of a sub-surface sensor system, in accordance with one or more embodiments of the present disclosure.
Figure 1D:
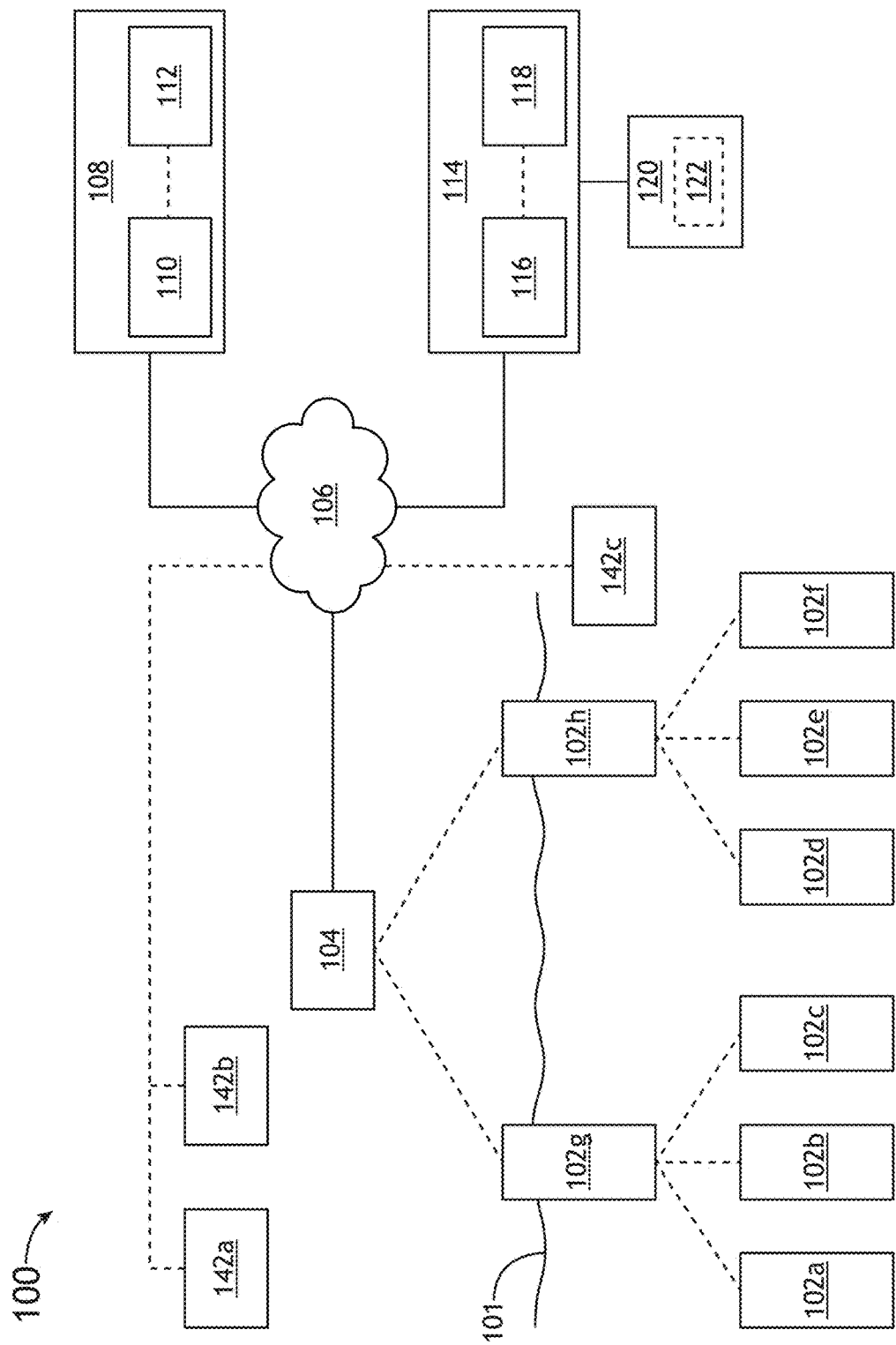
FIG. 1D illustrates a simplified block diagram of a sub-surface sensor system, in accordance with one or more embodiments of the present disclosure.

FIG. 1D illustrates a simplified block diagram of a subsurface sensor system 100, in accordance with one or more embodiments of the present disclosure. System 100 may include, but is not limited to, one or more sensor nodes 102, a data gateway 104, a network 106, a server 108, a controller 114, a user interface 120, and one or more operational devices 142.

In another embodiment, the one or more processors 110 of the server 108 and/or the one or more processors 116 of the controller 114 are configured to transmit one or more signals to the data gateway 104 and/or the sensor nodes 102 via the network 106. It is contemplated herein that the ability to transmit signals from the sensor nodes 102 to the server 108/controller 114, as well as transmit signals from the server 108/controller 114 to the sensor nodes 102 (e.g., bi-directional communication) may provide a number of advantages over previous approaches. For example, by transmitting signals from the server 108 and/or controller 114 to the sensor nodes 102, the sensor nodes 102 may be remotely adjusted, re-configured, and the like. By way of another example, it is contemplated herein that one or more signals transmitted from the server 108 and/or controller 114 may be configured to update software or firmware of the data gateway 104 and/or sensor nodes 102.

It is contemplated herein that system 100 may include one or more operational devices which may be manually and/or automatically adjusted by the one or more processors 110, 116 in response to data collected by the system 100. The one or more operational devices 142 may include any operation or application devices known in the art including, but not limited to, irrigation equipment/devices, spraying devices, sprinklers, drip lines, fans, heaters, drying equipment, fertilization equipment, chemical distribution equipment, pumps, valves, and the like. For instance, continuing with the example above, system 100 may include irrigation equipment (e.g., operational equipment 142a-142c) communicatively coupled to the server 108 and/or controller 114. The irrigation equipment (e.g., operational equipment 142a-142c) may be communicatively coupled to the server 110 and/or controller 114 using any technique known in the art. In this example, the one or more processors 110, 116 may be configured to automatically adjust one or more characteristics of the irrigation equipment (e.g., operational equipment 142a-142c) based on data collected by system 100. For instance, if data collected by the sensor nodes 102 indicate a particular section of a field has low moisture levels, the one or more processors 110, 116 may be configured to increase the irrigation durations, adjust the irrigation timing schedule, adjust the orientation of the operational equipment 142a-142c and the like.

By way of another example, system 100 may be implemented in a commodity storage context, with a plurality of sensor nodes 102 configured to collect data regarding sub-surface commodity characteristics. In this example, system 100 may further include operational equipment 142a-142c comprising drying equipment (e.g., fans, heaters, and the like) configured to regulate moisture levels of the commodities. The drying equipment (e.g., operational equipment 142a-142c) may be communicatively coupled to the server 108 and/or controller 114 using any technique known in the art. In this example, the one or more processors 110, 116 may be configured to automatically adjust one or more characteristics of the drying equipment (e.g., operational equipment 142a-142c) based on data collected by system 100. For instance, if data collected by the sensor nodes 102 indicate the commodities have high moisture levels, the one or more processors 110, 116 may be configured to increase fan speed or heating rate of the drying equipment (e.g., operational equipment 142a-142c).

By way of another example, system 100 may be implemented in the context of a golf course of turf management operation. In this example, system 100 may include operational equipment 142a-142c comprising sprinklers, drip lines, or the like, which are configured to regulate moisture levels, nutrient levels, and the like of the grass. The operational equipment 142a-142c (e.g., sprinklers, drip lines, and the like) may be communicatively coupled to the server 108 and/or controller 114 using any technique known in the art. In this example, the one or more processors 110, 116 may be configured to automatically adjust one or more characteristics of the operational equipment 142a-142c based on data collected by system 100. For instance, if data collected by the sensor nodes 102 indicate the high moisture levels, the one or more processors 110, 116 may be configured to transmit one or more signals to the operational equipment 142a-142c in order to adjust one or more characteristics of the turf care equipment including, but not limited to, duration of watering, frequency of watering, and the like.

It is noted herein that the one or more processors 110, 116 may be configured to transmit signals to equipment of system 100 either automatically or in response to a user input. For example, upon determining low moisture levels, the one or more processors 110, 116 may be configured to automatically transmit one or more signals to equipment (e.g., irrigation equipment, drip lines, and the like) in order to correct for the low moisture levels. By way of another example, a user may input one or more input commands via user interface 120, wherein the one or more input commands cause the one or more processors 110, 116 to transmit one or more signals to equipment of system 100.

It is further noted herein that embodiments in which controller 114 comprises a local controller may allow for data transmission and operational device 142 control even without an internet connection. For example, the data gateway 104 may be directly coupled to the controller 114 via a wired or wireless connection. In this example, the controller 114 may be configured to receive data from sensor nodes 102 and/or transmit signals to sensor nodes 102 and operational equipment 142 without the use of an internet or network connection.

FIG. 1B illustrates a simplified block diagram of a simplified block diagram of a sub-surface sensor system 100, in accordance with one or more embodiments of the present disclosure. It is noted herein that the description associated with system 100 depicted in FIG. 1A may be regarded as applying to system 100 depicted in FIG. 1B, unless noted otherwise herein. Similarly, the following description associated with system 100 depicted in FIG. 1B may be regarded as applying to system 100 depicted in FIG. 1A, unless noted otherwise herein.

In one embodiment, sub-surface sensor nodes 102a, 102b, 102c, may configured to collect data and "store-and-forward" collected data to additional sub-surface sensor nodes 102a, 102b, 102c. In this regard, sub-surface sensor nodes 102a-102c may be regarded as "repeater" or "store-and-forward" sub-surface sensor nodes 102a-102c. For example, as shown in FIG. 1B, a first sub-surface sensor node 102a may be configured to collect data, store data in memory, and transmit collected/stored data to a second sub-surface sensor device 102b. The second sub-surface sensor device 102b may be configured to receive data from the first sub-surface sensor device 102a, and store received data in memory. Additionally, the second sub-surface sensor device 102b may be configured to collect data itself and store collected data in memory. The second sub-surface sensor device 102b may then be configured to transmit collected data (e.g., data collected by the second sub-surface sensor device 102b and data received from the first sub-surface sensor device 102a) and transmit stored data to a third sub-surface sensor device 102c. Similarly, the third sub-surface sensor device 102c and a fourth sub-surface sensor device 102d may be configured to collect data on their own, receive data from the previous sub-surface sensor devices 102, store collected and received data in memory, and transmit stored data along to the data gateway 104.

It is noted herein that the ability of sub-surface sensor devices 102a-102c to repeat or store-and-forward collected and received data to additional sub-surface sensor devices 102 may increase the overall effective data transmission range of the sub-surface sensor devices 102. For example, it is contemplated herein that sub-surface sensor nodes 102 may be capable of reliably transmitting data to surface-sensor nodes 102d within a 100-500-foot radius. In this regard, without any "repeating" or "store-and-forward" capabilities each sub-surface sensor node 102a-102c would have to be within 100-500 feet of a surface sensor node 102d. However, with the store-and-forward configuration illustrated in FIG. 1B, it is contemplated that the effective data transmission range may be extended to multiple-mile transmission distances. Furthermore, it is noted herein that the store-and-forward configuration illustrated in FIG. 1B may further reduce the redundant data transmission costs. By including multiple sub-surface sensor nodes 102a-102c which transmit data to a single surface sensor node 102d which is communicatively coupled to the data gateway 104, recurring data transmission costs may be reduced as compared to a configuration in which each sensor node 102 transmits data directly to the data gateway 104.

In another embodiment, sub-surface sensor nodes 102 may be configured to transmit data directly to the data gateway 104. For example, as shown in FIG. 1B, sub-surface sensor nodes 102e, 102f may be configured to transmit data directly to the data gateway 104. It is contemplated herein that sub-surface sensor nodes 102 which are within an effective data transmission radius (e.g., "within range") of the data gateway 104 may be configured to transmit data directly to the data gateway 104. For instance, sub-surface sensor nodes 102e, 102f within a quarter of a mile from the data gateway 104 may be configured to transmit data directly to the data gateway 104. Conversely, it is contemplated herein that sub-surface sensor nodes 102 outside of the effective data transmission radius of the gateway 104 (e.g., sub-surface sensor nodes 102 further than a quarter of a mile from the data gateway 104) may be out of range from the data gateway 104, and may have to transmit data to one or more sensor nodes 102 until the data may be transmitted to the data gateway 104.

It is contemplated herein that varying weather conditions, material conditions (e.g., soil conditions), and the like, may cause sensor nodes 102 which were within range of another sensor node 102 or data gateway 104 to subsequently be out of range, and vis versa. For example, referring to FIG. 1B, sub-surface sensor node 102f may be within an effective data transmission range of the data gateway 104, and may therefore typically transmit data directly to the data gateway 104. Inclement weather conditions or soil conditions may subsequently affect the range of data transmission, effectively constricting the effective data transmission range and putting the sub-surface sensor node 102f out of range of the data gateway 104. In this example, when the sub-surface sensor node 102f is out of range or otherwise unable to transmit data directly to the data gateway 104, the sub-surface sensor node 102f may be configured to store collected data in memory until a time which the sub-surface sensor node 102f is back within range or is otherwise able to transmit data directly to the data gateway 104. In an additional and/or alternative embodiment, when the sub-surface sensor node 102f is out of range or otherwise unable to transmit data directly to the data gateway 104, the sub-surface sensor node 102f may be configured to transmit collected data to the sub-surface sensor node 102e, which may be within range of the data gateway 104. The sub-surface sensor node 102e may then be configured to store data received from the sub-surface sensor node 102f and forward the data on to the data gateway 104.

Accordingly, it is contemplated herein that the sensor nodes 102 of the present disclosure may be configured to identify other sensor nodes 102. In the event a sensor node 102 breaks or a particular sensor node 102 is unable to transmit data along its usual data transmission path to the data gateway 104, the sensor node 102 may be configured to identify another sensor node 102 to which it may transmit data, and thereby from an alternative data transmission path to the data gateway 104. For example, referring still to FIG. 1B, if the second sub-surface sensor node 102b breaks, or the first sub-surface sensor node 102a is otherwise unable to transmit data to the second sub-surface sensor node 102b, the first sub-surface sensor node 102a may be configured to identify other sensor nodes 102 to which the first sub-surface sensor node 102a may transmit data. For instance, if the first sub-surface sensor node 102a identified the third sub-surface sensor node 102c, the first sub-surface sensor node 102a may be configured to transmit data directly to the third sub-surface sensor node 102c, thereby forming a new data transmission path from the first sub-surface sensor node 102a to the data gateway 104.

FIG. 1C illustrates a simplified block diagram of a sub-surface sensor system 100, in accordance with one or more embodiments of the present disclosure. It is noted herein that the description associated with systems 100 depicted in FIGS. 1A-1B may be regarded as applying to system 100 depicted in FIG. 1C, unless noted otherwise herein. Similarly, the following description associated with system 100 depicted in FIG. 1C may be regarded as applying to systems 100 depicted in FIGS. 1A-1B, unless noted otherwise herein.

In one embodiment, surface sensor nodes 102 may be configured to "store-and-forward" collected data to additional surface sensor nodes 102. In this regard, surface sensor nodes 102 may be regarded as "repeater" or "store-and-forward" sub-surface sensor nodes 102. For example, as shown in FIG. 1C, a first surface sensor node 102a may be configured to collect data and transmit the data to a second surface sensor node 102b. The second surface sensor node 102b may be configured to collect data, and store collected data and data received from the first surface sensor node 102a in memory. The second surface sensor node 102b may be further configured to transmit stored data to the data gateway 104. In this regard, the second surface sensor node 102b may be regarded as a "repeater" or "store-and-forward" sensor node 102.

Figure 2:
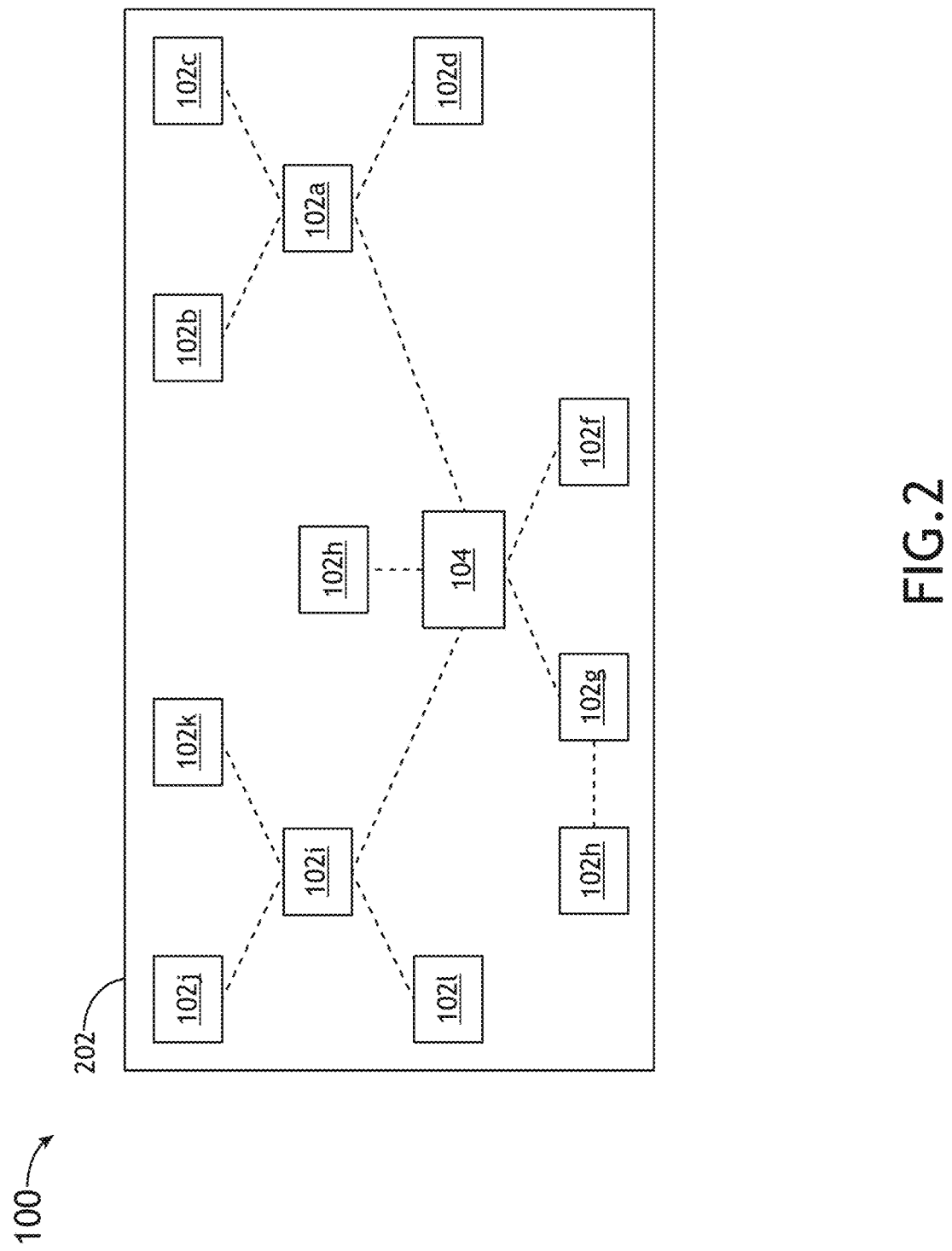
FIG. 2 illustrates a schematic view of a sub-surface sensor system, in accordance with one or more embodiments of the present disclosure.

FIG. 2 illustrates a schematic view of a sub-surface sensor system 100, in accordance with one or more embodiments of the present disclosure. In particular, FIG. 2 illustrates an aerial view of system 100 implemented in a field 202.

As shown in FIG. 2, system 100 may include one or more sensor nodes 102a-102l communicatively coupled, either directly or indirectly, to a data gateway 104. For example, sensor nodes 102f, 102g, and 102h may be configured to transmit collected data directly to data gateway 104. By way of another example, sensor nodes 102a, 102g, and 102i may serve as "store-and-forward" sensor nodes 102 which are configured to receive data from other sensor nodes (e.g., 102b, 102c, 102d, 102h, 102j, 102k, 102l), store received data, and forward stored data to the data gateway.

It is contemplated herein that the data gateway 104 may be positioned in a location which will minimize data transmission interferences, such as atop a barn, grain storage facility (e.g., silo), cellular tower, power line, etc. It is noted herein that positioning the data gateway 104 to minimize interference with topography, biomass, or other obstructions (e.g., trees, buildings, hills, and the like) may increase the efficiency of data transmission between the data gateway 104 and the sensor nodes 102, as well as between the data gateway 104 and the network 106. It is further contemplated herein that the data gateway 104 is positioned at a location which will maximize data connectivity and transmission and/or maximize the number of sensor nodes 102 which may be communicatively coupled to the data gateway 104. For example, as shown in FIG. 2, data gateway 104 may be positioned in a location substantially central within a field 202 such that the data gateway 104 may increase the efficiency of data transfer between the one or more sensor nodes 102 and the data gateway 104.

In another embodiment, system 100 may include multiple data gateways 104 which are communicatively coupled to the network 106. It is noted herein that multiple data gateways 104 which are communicatively coupled to the network 106 may maximize data transmission efficiency and the area covered by system 100. For example, in FIG. 2, field 202 may include a second data gateway 104b configured to communicatively couple to at least a subset of the one or more sensor nodes 102. By including an additional data gateway 104, the distance between at least a subset of the sensor nodes 102 and one of the data gateways 104 may be reduced, thereby increasing data transfer efficiency and reducing the potential for interference. In a similar manner, it is contemplated herein that each field 202 or a series of fields of a farming operation may include one or more data gateways 104 communicatively coupled to one or more sensor nodes 102, such that system 100 is configured to collect and generate data regarding each field of the farming operation.

The data collection and transmittal carried out through system 100 may be better understood with a detailed explanation of the sensor nodes 102. Accordingly, reference will be made to FIG. 3A.

Figure 3A:
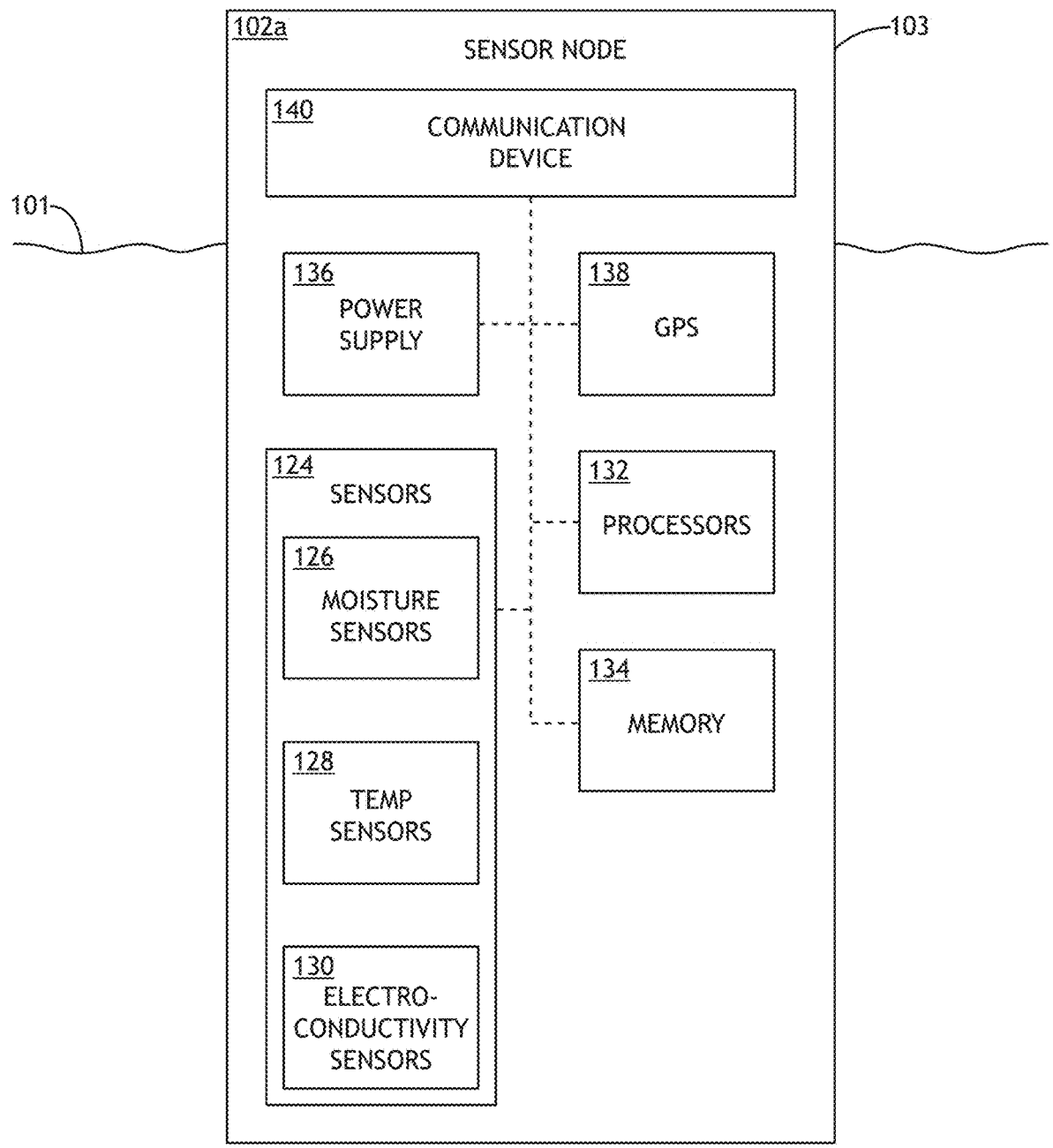
FIG. 3A illustrates a simplified block diagram of a sensor node, in accordance with one or more embodiments of the present disclosure.

FIG. 3A illustrates a simplified block diagram of a sensor node 102a, in accordance with one or more embodiments of the present disclosure. In embodiments, sensor node 102 may include, but is not limited to, one or more sensors 124, one or more processors 132, a memory 134, a power supply 136, a GPS device 138, and a communication device 140.

It is noted herein that the sensor node 102a, as depicted in FIG. 3A, may be regarded as applying to a sub-surface sensor node 102 (e.g., sensor nodes 102a-102f in FIG. 1A) and/or a surface sensor node 102 (e.g., sensor node 102g, 102h in FIG. 1A). For example, as illustrated in FIG. 1A, the sensor node 102a may comprise a surface sensor node 102a in which at least a portion of the sensor node 102a is positioned above the surface 101 of a material. However, this is shown purely for illustration, and is not to be regarded as a limitation of the present disclosure.

In one embodiment, as shown in FIG. 3A, all the components of the sensor node 102a may be contained within a single sensor node 102a housing 103. In one embodiment, the one or more sensors 124 of sensor node 102a include, but are not limited to, one or more moisture sensors 126, one or more temperature sensors 128, and one or more electroconductivity sensors 130. It is contemplated herein that the one or more sensors 124 may include additional and/or alternative sensors including, but not limited to, chemical composition sensors, pressure sensors, nutrient level sensors, pH, constituents, pest sensors, and the like. As noted previously herein, the one or more sensors 124 are configured to collect data regarding one or more sub-surface material characteristics. For example, in embodiments where sensor nodes 102 are positioned within the soil of an agricultural or turf setting, the one or more moisture sensors 126 may be configured to collect data regarding moisture levels of the soil, the one or more temperature sensors 128 may be configured to collect data regarding temperatures of the soil, and the one or more electroconductivity sensors 130 may be configured to collect data regarding electroconductivity levels of the soil.

In another embodiment, the one or more processors 132 are configured to receive data collected by the one or more sensors 124 and store time-stamped data in memory 134. In another embodiment, the one or more processors 132 may be configured to execute a set of program instructions stored in memory 134, the set of program instructions configured to cause the one or more processors 132 to carry out one or more steps of the present disclosure. For example, as noted previously herein, the one or more moisture sensors 126 may include capacitive soil moisture sensors 126 which measure soil moisture levels based on calculated capacitance levels. In this regard, the one or more processors 132 may be configured to receive capacitance level readings from the capacitive soil moisture sensors 126 and calculate material moisture levels based on the received capacitance level readings. The one or more processors 132 may then be further configured to store calculated moisture levels in memory 134.

In another embodiment, the sensor node 102a includes a power supply 136. It is noted herein that the power supply 136 may include any power supply known in the art including, but not limited to, one or more batteries, one or more battery packs, one or more energy-storing capacitors, and the like. It is contemplated herein that any power supply which is capable of long-lasting storage capabilities may be used in sensor node 102a, unless noted otherwise herein. In an additional and/or alternative embodiment, it is contemplated herein that sensor node 102a may be configured to harvest electrical energy from its environment. For example, the power supply 136 may further include an energy harvesting apparatus which is configured to harvest electrical energy from the ground or soil. It is contemplated herein that the power supply 136 may include one or more power supplies which are sized and configured to supply the sensor node 102a with enough electrical energy to allow the sensor node 102a to operate sub-surface for several years without requiring recharging, adjusting, or the like.

In another embodiment, the power supply 136 may include a power supply which is configured to enable remote charging capabilities. It is noted herein that a power supply 136 enabled with remote charging capabilities may allow the sensor node 102a to be charged without having to removed or uncovered from the material. For example, power supply 136 may include a power supply which may be inductively charged by a device above the surface. For instance, an inductive charging device may be placed on the underside of farming equipment (e.g., harvesting equipment, tilling equipment, and the like) such that the inductive charging device may inductively charge the power supply 136 as the farming equipment to which the inductive charging device is attached passes over the sensor node 102a.

In one embodiment, sensor node 102a may include a GPS device 138. The GPS device 138 may be configured to receive and/or transmit GPS signals in order to determine the position of the sensor node 102a. It is contemplated herein that the GPS position (e.g., GPS coordinates) may be time-stamped, saved in memory, and transmitted along with other stored data (e.g., temperature data, moisture level data, and the like) such that a user may be able to view the position of the sensor node 102a via display 122 of user interface 120. In another embodiment, GPS device 138 may utilize real-time kinematic (RTK) positioning techniques in order to improve the accuracy of GPS device 138 to sub-centimeter accuracy. It is further noted herein that the ability to determine the position/location of sensor nodes 102 may expedite the identification and retrieval of the sensor nodes 102. In additional and/or alternative embodiments, it is contemplated herein that the position/location of each sensor node 102 may be input by a user via the user interface 120. For example, a user may manually input the GPS location of a sensor device 102a via user interface 120 when the sensor device 102a is installed or otherwise positioned within a material (e.g., ground, soil, and the like). It is noted herein that the manual entry of sensor node 102 positions/locations may allow for the smaller and/or less expensive production of sensor nodes 102.

It is noted herein that a GPS device 138 which continuously transmits GPS location data may draw a significant amount of power from the power supply 136, and thereby decrease the operational life of the sensor node 102a. In this regard, the GPS device 138 may be configured to transmit GPS data at fixed time intervals. In another embodiment, the GPS device 138 may be configured to transmit GPS data in response to one or more signals received from the server 108 and/or controller 114 via the network 106. For example, when the time comes for sub-surface sensor node 102a to be retrieved and removed from the material (e.g., soil), a user may enter a command in user interface 120 which causes the controller 114 to transmit one or more signals via network 106 to the sub-surface sensor node 102a. The one or more signals may be configured to cause the GPS device 138 to transmit current GPS location data to the controller 114.

In some embodiments, sub-surface sensor nodes 102 may not include a GPS device 138. In these embodiments, it is contemplated herein that the precise location of sub-surface sensor nodes 102 may be determined based on communication with other sensor nodes 102. For example, referring to FIG. 2, sensor node 102c may comprise a sub-surface sensor node 102c without a GPS device 138. Conversely, sensor nodes 102a and 102b may comprise surface sensor nodes 102 with GPS devices 138a, 138b, respectively. By transmitting signals to both surface sensor node 102a surface sensor node 102b and/or additional/alternative sensor nodes 102, system 100 may be configured to determine the location of sub-surface sensor node 102c. Determining the location of sub-surface sensor node 102c may be carried out using any technique known in the art including, but not limited to, signal triangulation, received signal strength indication (RSSI), and the like.

In another embodiment, the sensor node 102a includes a communication device 140. The communication device 140 may be configured to communicatively couple the sensor node 102a to other sensor nodes 102a and/or the data gateway 104, as explained previously herein with respect to FIGS. 1A-1C. In this regard, the communication device 140 may include any network interface or communication circuitry known in the art configured to transmit data stored in memory 134 and receive data from other sensor nodes 102. For example, the communication device 140 may include transceiver device. For instance, the communication device 140 may include a LoRa transceiver device configured to transmit up to a +20 dBm level, and configured to receive/detect signals as low as −137 dBm level.

It is noted herein that any power and data transmission protocol known in the art may be utilized by sensor nodes 102 in order to facilitate power and data transfer among the various components of the sensor nodes 102. For example, a SDI-12, RS232, or other protocol may be utilized to facilitate power and data transfer between the one or more sensors 124, the one or more processors 132, memory 134, power supply 136, GPS device 138, and communication device 140.

As noted previously herein, the one or more processors 132 may be configured to execute a set of program instructions stored in memory 134, the set of program instructions configured to cause the one or more processors 132 to carry out various steps of the present disclosure. The one or more processors 132 may be configured to cause the communication device 140 to receive data from one or more additional sensor nodes 102 and store the received data in memory 134. The one or more processors 132 may be further configured to store data collected by the one or more sensors 124 in memory 134. The one or more processors 132 may be further configured to cause the communication device 140 to transmit data stored in memory 134 to one or more sensor nodes 102 and/or a data gateway 104. The one or more processors 132 may be further configured to cause the communication device 140 to identify additional sensor nodes 102 and/or data gateways 104 when the sensor node 102a is unable to transmit data to the sensor node 102 or data gateway 104 to which it was previously communicatively coupled. In another embodiment, the one or more processors 132 may be configured to cause the communication device 140 to receive one or more signals from the controller 114 or server 108, wherein the one or more processors 132 are configured to adjust one or more characteristics of sensor node 102a based on the received one or more signals.

It is further noted herein that the configuration illustrated in FIG. 3A may provide a number of advantages over previous sub-surface sensor devices. For example, many previous sub-surface sensor devices utilize components which each have their own processing components. For example, in a previous sub-surface sensor device, the one or more sensors 124 may each have their own processor, the GPS device 138 may have its own processor, the communication device 140 may have its own processor, and the like. Conversely, by providing one or more processors 132 which may provide processing functions to each and/or two or more of the components of the sensor node 102 (e.g., sensors 124, power supply 136, GPS unit 138, communication device 140, and the like), as illustrated in FIG. 3A, the configuration may be simplified and the cost of manufacturing the sensor node 102a may be drastically reduced. Furthermore, by providing one or more processors 132 which may provide processing functions to each of the components of the sensor node 102, the one or more processors 132 may more efficiently monitor and manage power generated and used by the one or more power supplies 136. This may allow for the one or more power supplies 136 to more efficiently use power, thereby extending the feasible operational life of the sensor node 102a. Details regarding the circuitry and power consumption of the sensor node 102 will be discussed in further detail herein with respect to FIG. 9.

Figure 3B:
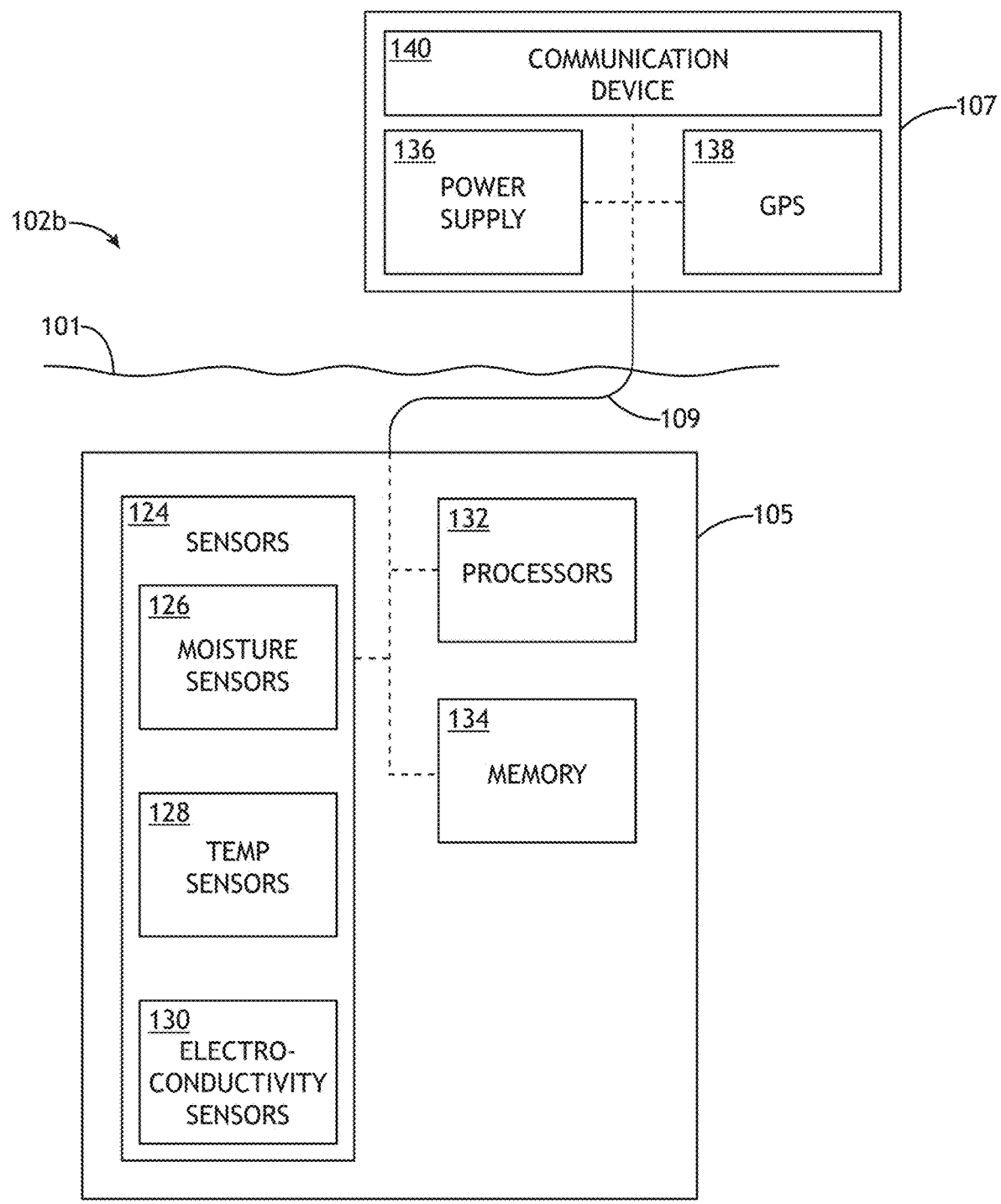
FIG. 3B illustrates a simplified block diagram of a sensor node, in accordance with one or more embodiments of the present disclosure.

FIG. 3B illustrates a simplified block diagram of a sensor node 102b, in accordance with one or more embodiments of the present disclosure. It is noted herein that the description associated with sensor node 102a depicted in FIG. 3A may be regarded as applying to sensor node 102b depicted in FIG. 3B, unless noted otherwise herein. Similarly, the following description associated with sensor node 102b depicted in FIG. 3B may be regarded as applying to sensor node 102a depicted in FIG. 3A, unless noted otherwise herein.

It is noted herein that the sensor node 102b, as depicted in FIG. 3B, may be regarded as applying to a surface sensor node 102 (e.g., sensor nodes 102g, 102h in FIG. 1A). However, this is not to be regarded as a limitation on the scope of the present disclosure. In this regard, sensor node 102b may also comprise a sub-surface sensor node 102b in which all of the components of the sensor node 102b are positioned below the surface 101 of a material.

In one embodiment, the components of sensor node 102b may be contained within two or more housings. For example, the one or more sensors 124, the one or more processors 132, and the memory 134 of the sensor node 102b may be contained within a first housing 105, wherein the communication device 140, power supply 136, and GPS device 138 are contained within a second housing 107. In one embodiment, the first housing 105 may be positioned below the surface 101 of a material, and the second housing 107 may be positioned above the surface 101 of the material. In another embodiment, the various components contained within the first housing 105 and the second housing 107 are communicatively coupled. For example, as depicted in FIG. 3B, the various components contained within the first housing 105 and the second housing 107 may be communicatively coupled via a wired connection 109.

It is noted herein that the positioning of the various components of sensor node 102 (e.g., processors 132, memory 134, power supply 125, GPS device 138, and the like, is not to be regarded as a limitation of the present disclosure, unless noted otherwise herein. For example, various components which are illustrated as being positioned within the first housing 105 may additionally and/or alternatively be positioned within the second housing 107.

It is noted herein that positioning at least a portion of a sensor node 102 (e.g., second housing 107 of sensor node 102) above the surface 101 of a material may allow for several advantages. First, by positioning the communication device 140 above the surface 101 of the material, data communication to and from the sensor node 102b may be improved due to the absence of interference caused by material below the surface 101 of the material. Similarly, by positioning the GPS device 138 above the surface 101 of the material may allow the GPS device 138 to more efficiently and effectively communicate with one or more GPS satellites, which may lead to the GPS device 138 requiring less power and more accurately identifying the position/location of the sensor node 102b. Additionally, positioning the power supply 136 of the sensor node 102b above the surface 101 of the material may allow the power supply 136 to be more easily re-charged, adjusted, repaired, or replaced. For example, in embodiments where the power supply 136 includes a battery, positioning the power supply 136 (e.g., battery) above the surface 101 of the material may allow the battery to be readily charged and/or replaced, thereby prolonging the operational life of the sensor node 102b.

It is further noted, however, that the surface sensor node 102b configuration illustrated in FIG. 3B is not to be regarded as limiting, unless noted otherwise herein. In this regard, sensor node 102b illustrated in FIG. 3B may alternatively comprise a sub-surface sensor node 102b in which both the first housing 105 and the second housing 107 are positioned below the surface 101 of the material.

Figure 4:
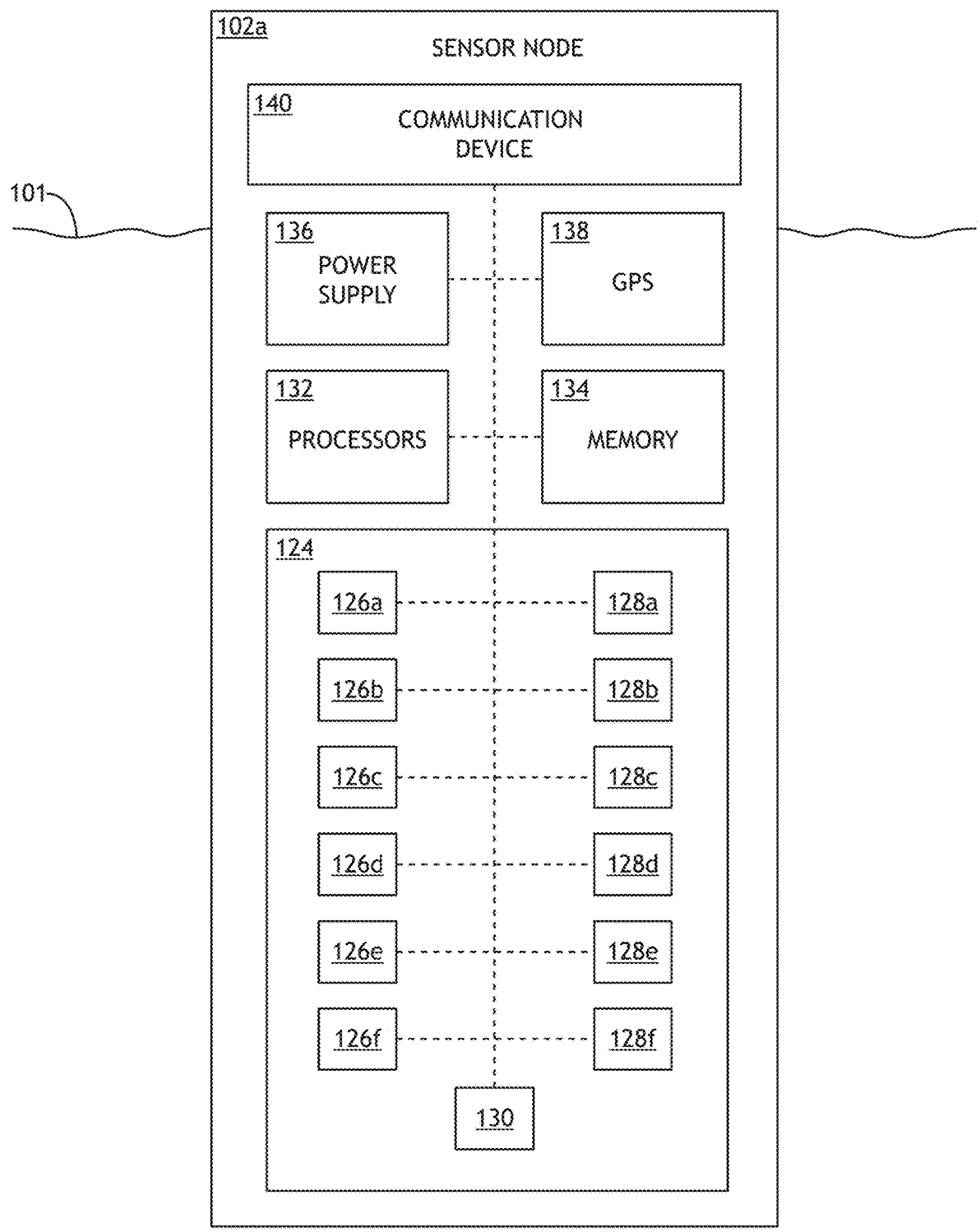
FIG. 4 illustrates a conceptual diagram of a sensor node, in accordance with one or more embodiments of the present disclosure.

FIG. 4 illustrates a conceptual diagram of a sensor node 102, in accordance with one or more embodiments of the present disclosure. It is noted herein that the description associated with sensor nodes 102a, 102b depicted in FIGS. 3A-3B may be regarded as applying to sensor node 102 depicted in FIG. 4, unless noted otherwise herein. Similarly, the following description associated with sensor node 102 depicted in FIG. 4 may be regarded as applying to sensor nodes 102a-102b depicted in FIGS. 3A-3B, unless noted otherwise herein.

In one embodiment, the one or more sensors 124 may include a plurality of various sensors. For example, as shown in FIG. 4, the one or more moisture sensors 126 may include a plurality of moisture sensors 126a-126n. By way of another example, the one or more temperature sensors 128 may include a plurality of temperature sensors 128a-126n. In another embodiment, the plurality of moisture sensors 126a-126n and/or the plurality of temperature sensors, electroconductivity sensors, pH sensors, constituent sensors, nutrient sensors 128a-128n may be arranged at varying depths. For instance, a first moisture sensor 126a may be configured to measure a moisture level of the material (e.g., soil) of a first area of interest at a first depth and a second moisture sensor 126b may be configured to measure a moisture level of the material (e.g., soil) at a second area of interest at a second depth, where the first depth is different from the second depth. It is noted herein that measuring characteristics of a material and collecting data at varying depths may provide valuable information regarding the material. For example, a high moisture level near the surface 101 measured by the first moisture sensor 126a and a low moisture level measured far below the surface 101 by a fifth moisture sensor 126e may indicate that water or other liquids are being absorbed by crops or other biomass near the surface 101, and are not efficiently penetrating the soil.

In another embodiment, data collected by sub-surface sensor nodes 102 may be supplemented by data collected via satellite imagery. For example, satellite imagery may be used to collect data regarding material characteristics (e.g., soil) near the surface 101. This may eliminate or reduce the need for surface sensor nodes 102.

In another embodiment, the one or more sensors 124 include one or more electroconductivity sensors 130. The one or more electroconductivity sensors 130 may be arranged below the one or more moisture sensors 126a-126n and the one or more temperature sensors 128a-128n, as illustrated in FIG. 4. However, this is not to be regarded as a limitation on the scope of the present disclosure. In this regard, one or more electroconductivity sensors 130 may be arranged such that they are configured to measure electroconductivity levels at varying depths from the surface 101 of the material. Furthermore, as noted previously herein, the one or more sensors 124 may include one or more additional and/or alternative sensors including, but not limited to, chemical composition sensors, pressure sensors, nutrient level sensors, and the like.

Figure 5:
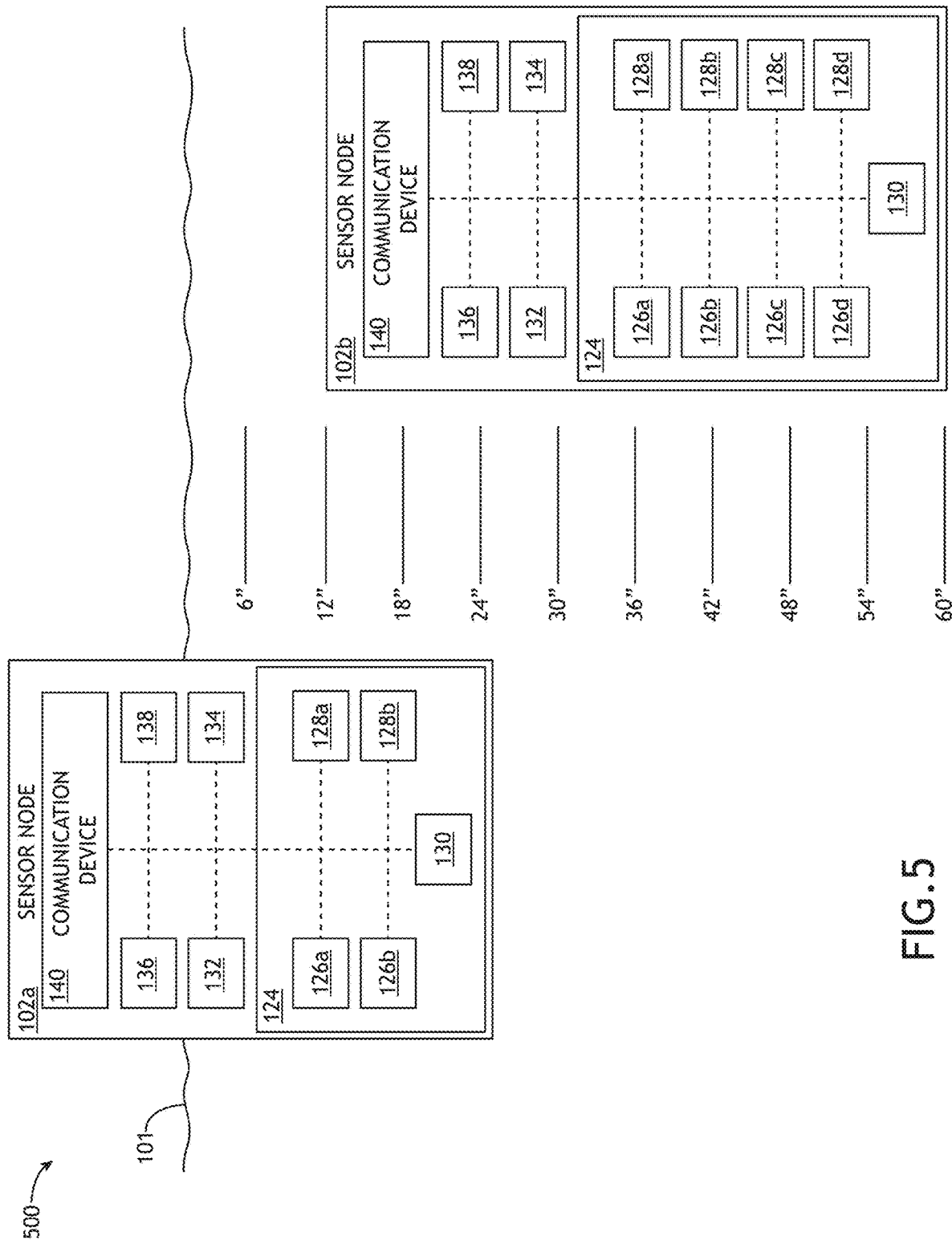
FIG. 5 illustrates an installation depth chart of sensor nodes, in accordance with one or more embodiments of the present disclosure.

FIG. 5 illustrates an installation depth chart 500 of sensor nodes 102a, 102b, in accordance with one or more embodiments of the present disclosure. In particular, chart 500 illustrates example installation depths of a surface sensor node 102a and a sub-surface sensor node 102b.

In one embodiment, sub-surface sensor nodes 102 (e.g., sub-surface sensor node 102b) may be installed below the surface 101 of a material at a sufficient depth to prevent the sub-surface sensor nodes 102 (e.g., sub-surface sensor node 102b) from being damaged by above-ground operations. In another embodiment, sub-surface sensor nodes 102 (e.g., sub-surface sensor node 102b) may be installed below the surface 101 of a material at a sufficient depth to allow for effective data transmission to and from the sub-surface sensor nodes 102b. For example, as shown in FIG. 5, sub-surface sensor node 102b is installed approximately twelve inches below the surface 101 of the material (e.g., 12 inches below ground). It is noted herein that a depth of approximately ten inches has been found to be a sufficient depth at which to install sub-surface sensor nodes 102b to ensure the sub-surface sensor nodes 102b are not damaged by tilling, planting, or harvesting operations, while still ensuring efficient data transmission to and from the sub-surface sensor nodes 102b.

In another embodiment, surface sensor node 102a and sub-surface sensor node 102b may be installed such that data collected by the surface sensor node 102a and the sub-surface sensor node 102b is collected at regular and/or continuous intervals. For example, as shown in chart 500, the one or more sensors of the surface sensor node 102a may collect data regarding material characteristics from the surface 101 until a depth of approximately 18 inches. Conversely, the sub-surface sensor node 102b may collect data regarding material characteristics from a depth of approximately 18 inches to depths of approximately 60 inches. It is noted herein that installing surface sensor nodes 102a and sub-surface sensor nodes 102b in such a manner may allow for material characteristics (e.g., moisture levels, temperatures, electroconductivity levels) to be measured on a consistent, contiguous basis from the surface 101 to a particular depth. In such a configuration, data may be collected by different sensor nodes 102 without creating gaps of depths at which no material data is collected.

It is noted herein that the installation depths and configurations illustrated in chart 500 are provided for exemplary purposes. In this regard, additional and/or alternative installation depths and configurations may be used without departing from the spirit or scope of the present disclosure. It is further noted herein that the material within which sub-surface characteristics are being measured may affect the depths at which sub-surface sensor nodes 102 may be installed.

While much of the present disclosure is directed to the use of system 100 in an agricultural context, this is not to be regarded as a limitation on the scope of the present disclosure. In this regard, it is contemplated herein that embodiments disclosed herein may be used in any industry or context in which sub-surface characteristics may be desired. For example, farmers, agronomists, arborists, golf course managers, homeowners, and the like may utilize embodiments of system 100 in order to identify soil watering requirements, in near-real time, throughout crop-growing seasons, golfing seasons, summers, and the like. Furthermore, the addition of chemical or other types of sensors within sensor nodes 102 may provide commercial users to identify soil nutrient levels, pesticide levels, pest and/or microbe levels, macro-nutrient levels, and the like in near-real time. Embodiments of the present disclosure may be advantageous to commercial users (e.g., farmers, agronomists, arborists, and the like) by increasing the versatility of data collection while simultaneously decreasing annual input and labor costs. On the other hand, golf course managers, homeowners, turf managers, playing field managers (e.g., soccer field managers, football field managers, and the like) may benefit from the sub-surface sensor nodes 102 of the present disclosure, in that they may provide valuable soil moisture, temperature, and or nutrient data without compromising the cosmetic appearance of the greens, lawns, courses, fields, or landscaping.

Embodiments of the present disclosure may be used in conjunction with agricultural fields, orchards, greenhouses, pipelines, and the like in order to identify soil moisture levels near drip irrigation lines and/or underground pipelines. Furthermore, by placing sensor nodes 102 near drip irrigation lines/underground pipelines, it is contemplated herein that system 100 may be configured to identify drastic, sudden, or unexpected increases in soil moisture, gas, nutrient, constituent, and pH, levels as potential leaks or other damage to the drip irrigation lines and/or underground liquid or gas pipelines. In this regard, alerts generated by system 100 may serve as an advanced warning system to prevent equipment damage or the waste of water, pesticides, herbicides, or other materials. Similarly, homeowners or turf managers may install sensor nodes 102 proximate to sprinkler heads in yards and sports fields in order to identify individual sprinkler heads or sprinkler zones which may have a leak or be malfunctioning. Furthermore, utilizing system 100 in yards, fields, or courses may allow for more individual zone control and water conservation.

Embodiments of the present disclosure may be further utilized in construction and/or infrastructure contexts. For example, utilizing sub-surface sensor nodes 102 of system 100 within curing concrete may allow construction development managers to monitor the proper curing of the concrete and to ensure a solid, consistent pour. By way of another example, burying sub-surface sensor nodes 102 and/or surface sensor nodes near or within roads, train tracks, bridge abutments, subway tunnels, and the like, may allow civil engineers to monitor environmental and safety concerns (e.g., erosion, concrete stability, track safety, and the like) in order to ensure public safety. Similarly, it is contemplated herein that sensor nodes 102 may include one or more accelerometers which are configured to collect acceleration data. Acceleration data may then be used for a number of applications including, but not limited to, tracking movements (e.g., train or vehicle movement, movements of groups of animals, and the like), predicting earthquakes recording earthquake tremor data, and the like.

Embodiments of the present disclosure may additionally be utilized in waste handling contexts. For example, submerging sub-surface sensor nodes 102 within municipal, industrial, or animal waste volumes (e.g., tanks, ponds, landfills, and the like) may allow facility managers to monitor characteristics of the waste including temperature, level/depth, runoff constituents, chemical gasses, leaching constituents, and the like. It is noted herein that monitoring waste characteristics in real time or near-real time may provide for safer and more efficient waste management techniques. By way of another example, submerging sub-surface sensor nodes 102 within manure or compost piles may allow a farmer or waste operator to monitor heat production, prevent compost spoilage, and ensure the safe disposal of waste.

Embodiments of the present disclosure may additionally be utilized in the context of commodity storage. For example, submerging sub-surface sensor nodes 102 within volumes of commodities (e.g., grain piles, grain bags, potatoes, sugar beets, grains, silage, wheat, corn, soybeans, hay bales, barley, and the like), may allow farmers or storage managers to monitor temperature, moisture levels, protein levels of the commodity in real or near-real time. It is noted herein that monitoring the temperature and moisture levels of commodities in real or near real time may help prevent the unintentional spoilage, fermentation, or spontaneous combustion of the commodities. Furthermore, as noted previously herein, a system 100 implemented in a commodity context may further include operational devices 142 which may be automatically controlled by the system 100 in response to data collected by the system. For example, multiple sensor nodes 102 may be buried within a volume of grain stored within a silo. The sensor nodes 102 may be configured to measure the temperature and moisture levels of the grain at varying depths. In this example, system 100 may further include drying equipment (e.g., operational equipment 142) of the grain silo. In this regard, if the one or more sensor nodes 102 collected data which indicated that the temperature or moisture level of the grain was becoming too high or too low, the controller 114 and/or server 108 of system 100 may be configured to transmit one or more signals to adjust one or more characteristics of the drying equipment (e.g., operational equipment 142) in order to correct the temperature or moisture level of the grain.

Embodiments of the present disclosure may be further utilized in animal farming contexts. For example, submerged sub-surface sensor nodes 102 within a fish pond may allow for the remote real-time or near-real time monitoring of water conditions, including pH, salinity, temperature and the like. It is even contemplated herein that sensor nodes 102 including motion sensors may be utilized to monitor activity of the fish. By way of another example, surface sensor nodes 102 and sub-surface sensor nodes 102 in cattle feedyards may allow feedyard managers to monitor manure movement, nutrient leaching, and the like. Furthermore, it is contemplated that sensor nodes 102 within a feedyard or other livestock facility may be used to track the application and movement of effluent from one or more areas or facilities where the effluent is applied. In this regard, embodiments of system 100 may help reduce over application of effluent and material waste.

It is noted herein that the one or more components of system 100 may be communicatively coupled to the various other components of system 100 in any manner known in the art. For example, various components of system 100 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

In one embodiment, the one or more processors 110, 116, 132 may include any one or more processing elements known in the art. In this sense, the one or more processors 110, 116, 132 may include any microprocessor-type device configured to execute software algorithms and/or instructions. In one embodiment, the one or more processors 110, 116, 132 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 110, 116, 132. In general, the term "processor" may be broadly defined to encompass any device having one or more processing elements, which execute program instructions from memory 112, 118, 134. Moreover, different subsystems of the system 100 (e.g., data gateway 104, sensors 124, power supply 136, GPS device 138, communication device 140, and the like) may include processor or logic elements suitable for carrying out at least a portion of the steps described throughout the present disclosure. Therefore, the above description should not be interpreted as a limitation on the present disclosure but merely an illustration.

The memory 112, 118, 134 may include any storage medium known in the art suitable for storing program instructions executable by the associated one or more processors 110, 116, 132. For example, the memory 112, 118, 134 may include a non-transitory memory medium. For instance, the memory 112, 118, 134 may include, but is not limited to, a read-only memory (ROM), a random access memory (RAM), a magnetic or optical memory device (e.g., disk), a magnetic tape, a solid state drive and the like. In another embodiment, the memory 112, 118, 134 is configured to store data collected by the one or more sensors 124 and GPS data generated and/or received by the GPS unit 138. It is further noted that memory 112, 118, 134 may be housed in a common controller housing with the one or more processors 114, 116, 132. In an alternative embodiment, the memory 112, 118, 134 may be located remotely with respect to the physical location of the processors 110, 116, 132, and server 108, controller 114, and the like. In another embodiment, the memory 112, 118, 134 maintains program instructions for causing the one or more processors 110, 116, 134 carry out the various steps described through the present disclosure.

It is noted that the network various components of system 100 (e.g., data gateway 104, server 108, controller 114, and the like) may include a network interface (not shown) configured to communicatively couple the various components to the network 106. The network interface may include any network interface circuitry or network interface device suitable for interfacing with network 106. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 4G LTE, 5G, 6G, WiFi protocols, RF, LoRa, and the like.

Figure 6A:
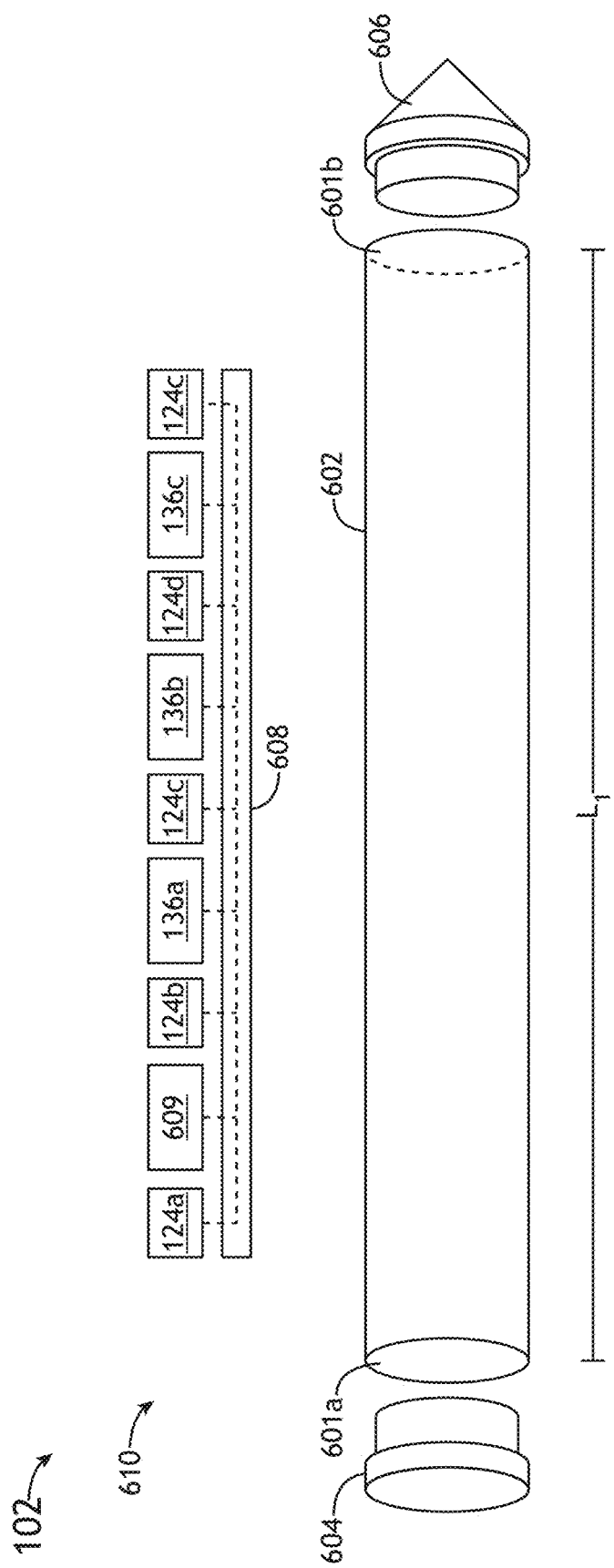
FIG. 6A illustrates an exploded view of a sensor node, in accordance with one or more embodiments of the present disclosure.

FIG. 6A illustrates an exploded view 610 of a sensor node 102, in accordance with one or more embodiments of the present disclosure. It is noted herein that any discussion associated with sensor nodes 102a, 102b illustrated in FIGS. 3A-3B may be regarded as applying to sensor nodes 102 illustrated in FIGS. 6A-6E, unless noted otherwise herein. Similarly, any discussion associated with sensor nodes 102 illustrated in FIGS. 6A-6E may be regarded as applying to sensor nodes 102a, 102b illustrated in FIGS. 3A-3B, unless noted otherwise herein.

In particular, exploded view 610 illustrates a manner of producing sensor nodes 102 in a modular fashion. In one embodiment, sensor node 102 includes, but is not limited to, a sensor node body 602, a top cap 604, a bottom cap 606, a base structure 608, one or more sensors 124, an electronics board 609, and one or more power supplies 136. In one embodiment, the sensor node body 602 may comprise a hollow tube with a first opening 601a and a second opening 601b. It is contemplated herein that the sensor node body 602 may be buried or submerged in a wide variety of materials (e.g., soil, industrial waste, concrete, and the like) for long periods of time (e.g., three years or more) without decaying or decomposing. In this regard, it is contemplated herein that sensor node body 602 is made of a material which does not decay or decompose when exposed to moisture or chemicals including, but not limited to, plastic, aluminum, coated steel, and the like.

In another embodiment, the various components of sensor node 102 (e.g., one or more sensors 124, one or more processors 132, memory 134, power supply 136, GPS device 138, communication device 140, and the like) may be produced on the base structure 608. In this regard, the base structure 608 may include any structure known in the art including, but not limited to, a DIN rail, a printed circuit board, and the like. In one embodiment, base structure 608 is structurally rigid. In one embodiment, the various components of sensor node 102 may be produced or disposed on base structure 608 such that they are communicatively coupled. For example, sensors 124a-124e and power supplies 136a-136c may be disposed on the base structure such that they are communicatively coupled. It is noted herein that the one or more sensors 124a-124e may include any sensors known in the art including, but not limited to, one or more moisture sensors 126, one or more temperature sensors 128, one or more electroconductivity sensors 130, and the like). In the interests of simplicity, electronics board 609 may be regarded as including various other components of the sensor node 102 including, but not limited to, the one or more processors 132, memory 134, GPS unit 138, communication device 140, and the like.

In one embodiment, various components of sensor node 102 may be produced or disposed on base structure 608 in a modular fashion. In this regard, it is contemplated herein that the various components disposed on base structure 608 may be removed, rearranged, or replaced with alternative and/or additional components. It is contemplated herein that the modular arrangement of components on base structure 608 may allow for sensor nodes 102 to be constructed in a specific fashion based on the specific needs at hand. Furthermore, the ability to remove and rearrange components on base structure 608 may allow for broken components to be replaced, as well as a single sensor node 102 to be re-designed to fit varying purposes, thereby allowing bespoke, custom data collection solutions.

Figure 6B:
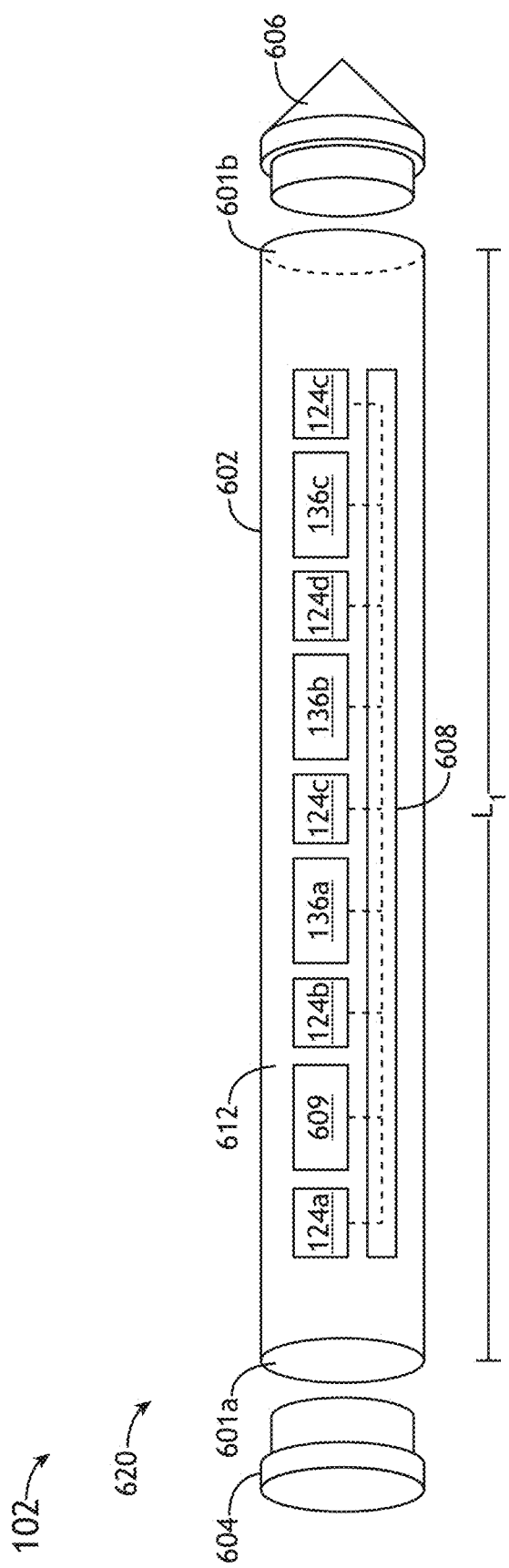
FIG. 6B illustrates an exploded view of a sensor node, in accordance with one or more embodiments of the present disclosure.

FIG. 6B illustrates an exploded view 620 of a sensor node 102, in accordance with one or more embodiments of the present disclosure.

As shown in FIG. 6B, the base structure 608 including the various components of the sensor node 102 may be inserted within the sensor node body 602 through the first opening 601a and/or the second opening 601b. It is contemplated herein that the base structure 608 may be substantially the same length $L_1$ as the sensor node body 602. However, this is not to be regarded as a limitation on the scope of the present disclosure.

It is noted herein that the base structure 608 including the various components of the sensor node 102 may not completely or fully fill the volume 612 of the sensor node body 602. In this regard, volume 612 may include empty space. Empty space within the sensor node body 602 may allow the base structure 608 and/or components disposed on the base structure 608 to be jostled around, dislodged, or damaged as the sensor node 102 is moved around. Accordingly, in one embodiment, the volume 612 may be filled with a substance which is configured to fill the volume 612 within the sensor node body 602 in order to hold the base structure 608 and/or components disposed on the base structure 608 firmly in place. The substance may include any substance known in the art including, but not limited to, urethane, acrylic, epoxy, materials with a conformal coating, an expanding foam, a Styrofoam insert, and the like. It is further noted herein that filing volume 612 with a substance may further prevent water or other material from leaking into the sensor node body 602 and damaging components of the sensor node 102.

Figure 6C:
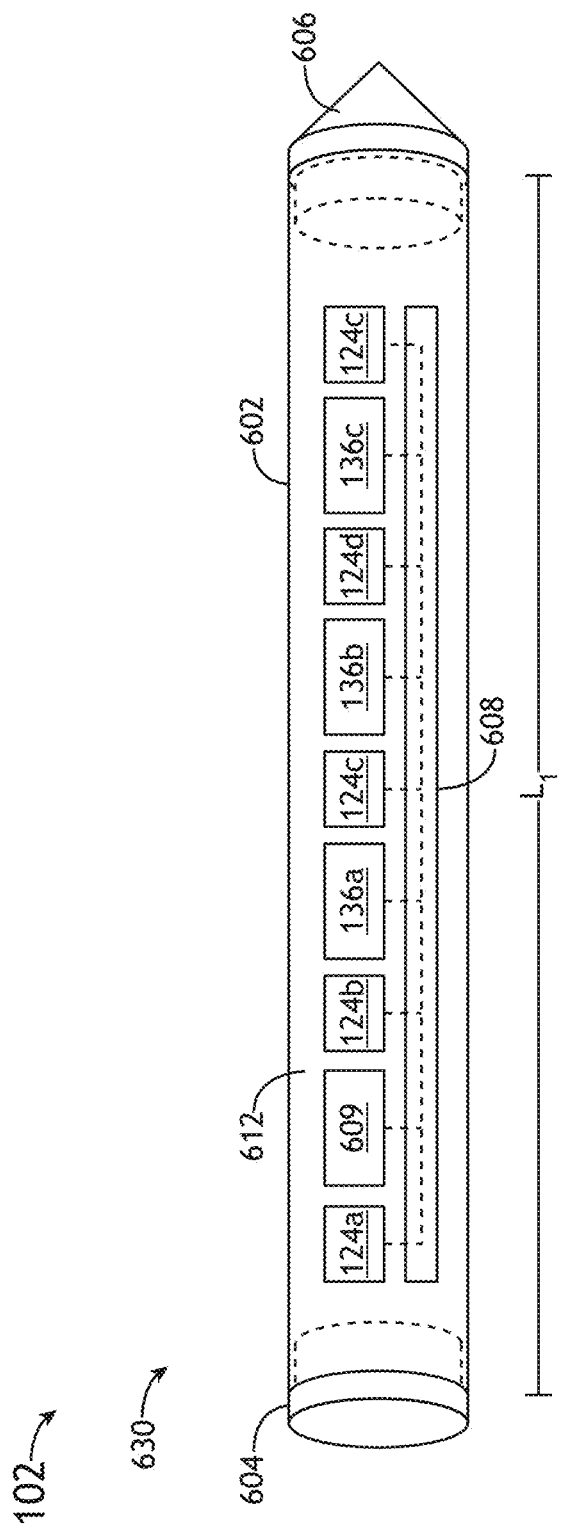
FIG. 6C illustrates a perspective view of a sensor node, in accordance with one or more embodiments of the present disclosure.

FIG. 6C illustrates a perspective view 630 of a sensor node 102, in accordance with one or more embodiments of the present disclosure.

In one embodiment, the top cap 604 may be inserted into the first opening 601a of the sensor node body 602. Similarly, in another embodiment, the bottom cap 606 may be inserted into the second opening 601b of the sensor node body 602. The top cap 604 and the bottom cap 606 may be secured to the sensor node body 602 using any technique known in the art including, but not limited to, welds, solder, friction welds, adhesives, and the like. It is noted that any permanent or semi-permanent technique known in the art may be used. It is further noted herein that securing the top cap 604 and the bottom cap 606 to the sensor node body 602 may prevent moisture and other material from entering the sensor node body 602 and damaging components of the sensor node 102. In one embodiment, the bottom cap 606 includes a pointed end. It is noted herein that a pointed end on the bottom cap 606 may facilitate the installation of the sensor node 102 within a material, including soil.

Figure 6D:
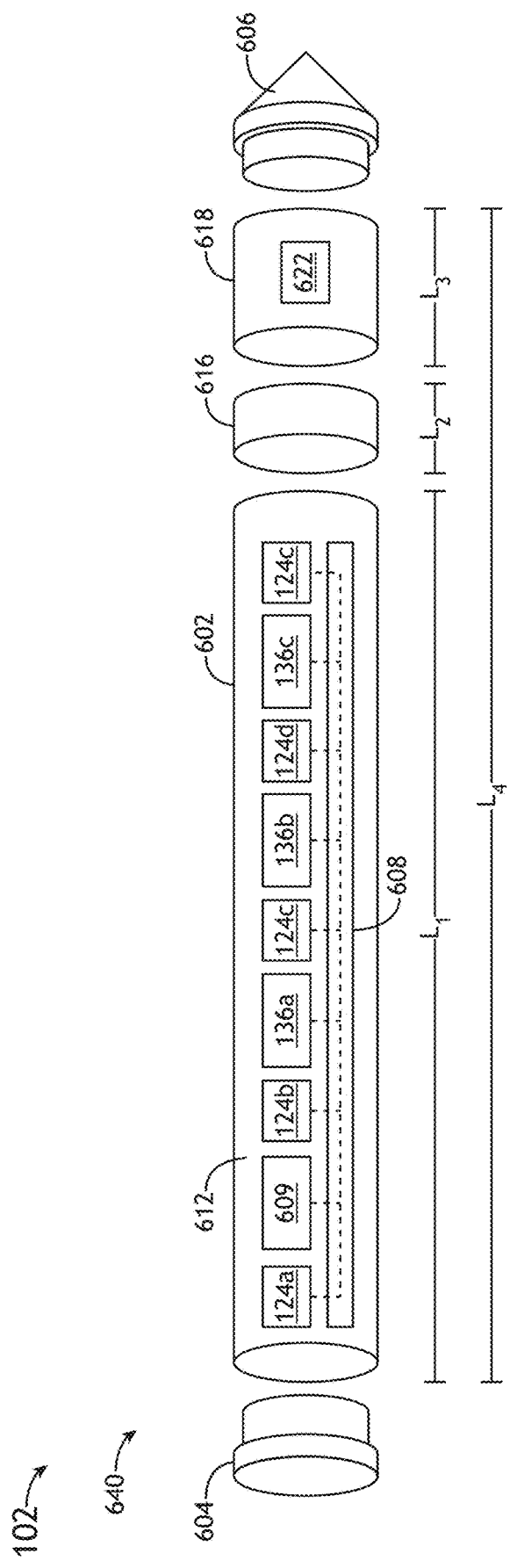
FIG. 6D illustrates an exploded view of a sensor node integrated with an additional sensor device, in accordance with one or more embodiments of the present disclosure.

FIG. 6D illustrates an exploded view 640 of a sensor node 102 integrated with an additional sensor device 622, in accordance with one or more embodiments of the present disclosure.

FIG. 6D illustrates how components of sensor node 102 may be integrated with one or more additional sensor devices 622 in a modular fashion. In one embodiment, sensor node 102 may be configured to integrate with one or more additional sensor devices 622. For example, as shown in FIG. 6D, the sensor node body 602 may be configured to couple to an adapter 616, wherein the adaptor 616 is configured to couple the sensor node body 602 to an additional body 618 containing one or more additional sensor devices 622. It is noted herein that the ability to couple the sensor node body 602 (and thereby the sensor node 102) to one or more additional sensor devices 622 may allow the sensor node 102 to take advantage of updated sensors, third-party sensor devices, and the like. For instance, the one or more additional sensor devices 622 may comprise moisture sensors produced by a third party manufacturer.

It is further noted herein that coupling one or more additional sensor devices 622 to the sensor node body 602 may provide for a number of advantages. For example, coupling one or more additional sensor devices 622 may allow for a user to create a more bespoke, customized data collection solution which is tailored to their particular needs. By way of another example, coupling one or more additional sensor devices 622 may allow for one or more components of the sensor node 102 disposed on the base structure 608 to be removed. For instance, where the one or more additional sensor devices 622 include moisture sensors, one or more moisture sensors 126 (illustrated as sensors 124 in FIG. 6D) may be removed from the base structure 608, thereby simplifying the design and reducing the cost to manufacture the sensor node 102.

Figure 6E:
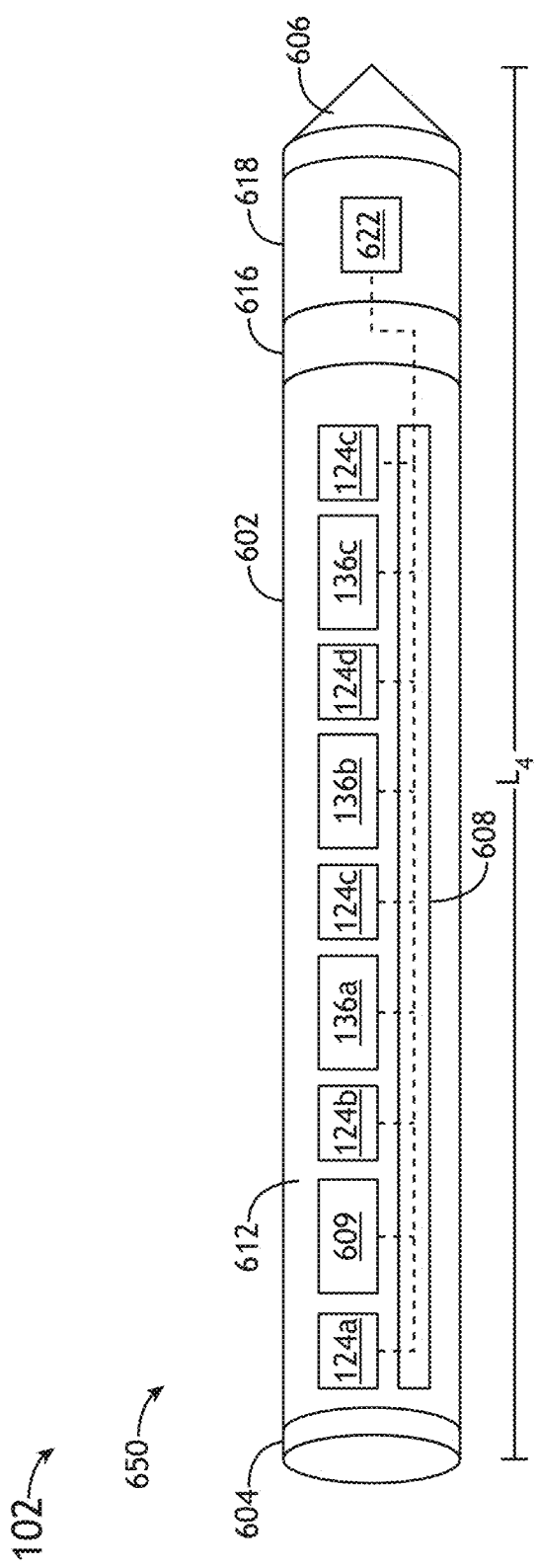
FIG. 6E illustrates a perspective view of a sensor node integrated with an additional sensor device, in accordance with one or more embodiments of the present disclosure.

FIG. 6E illustrates a perspective view 650 of a sensor node 102 integrated with an additional sensor device 622, in accordance with one or more embodiments of the present disclosure.

In one embodiment, the adaptor 616 is configured to communicatively couple the one or more additional sensor devices 622 contained within the additional body 618 to the components disposed on the base structure 608 (e.g., one or more sensors 124, electronics board 609, one or more power supplies 136, and the like). The one or more additional sensor devices 622 may be communicatively coupled to the components disposed on the base structure 608 using any wired or wireless connection known in the art. As noted previously herein, the volume 612 within the sensor node body 602, adapter 616, and/or additional body 618 may be filled with a substance, such as urethane, acrylic, epoxy, materials with a conformal coating, or an expanding foam.

Furthermore, the sensor node body 602, adapter 616, and/or additional body 618 may be coupled to one another using any technique known in the art including, but not limited to, welds, solder, friction welds, adhesives, and the like.

In a similar manner, it is contemplated herein that the sensor node body 602 may be configured to couple to an additional body (not shown) which contains a data transmission head (e.g., communication device 140). For example, a data transmission head including a communication device 140 may be coupled to the sensor node body 602 between the sensor node body 602 and the top cap 604. The data transmission head may be constructed using any technique known in the art including, but not limited to, injection molding, blow molding, 3D printing, over-molding, and the like. Additionally, the data transmission head may be made of any material including, but not limited to, plastic, aluminum, coated steel, and the like. Furthermore, it is contemplated herein that a data transmission head may allow for the sensor node 102 to utilize communication devices 140 manufactured from third-party manufacturers. In this regard, the components disposed on the base structure 608 may be communicatively coupled to one or more communication devices 140 contained within a data transmission head using any connections or adaptors known in the art.

It is further noted herein that the modular configuration of the sensor nodes 102, as depicted in FIGS. 6A-6E, may facilitate remote sensing devices which utilize technology from a number of suppliers. For example, by utilizing the modular configuration of sensor nodes 102, third parties may be able to incorporate various components of the sensor node 102 (e.g., transmission head, sensors 124, and the like) into third-party sensor devices. By manufacturing sensor nodes 102 in such a manner that sensor nodes 102 may be able to incorporate, and to be incorporated within, third-party sensor devices, the sensor nodes 102 of the present disclosure may foster third-party collaboration and facilitate more custom, personalized data collection solutions.

Figure 7:
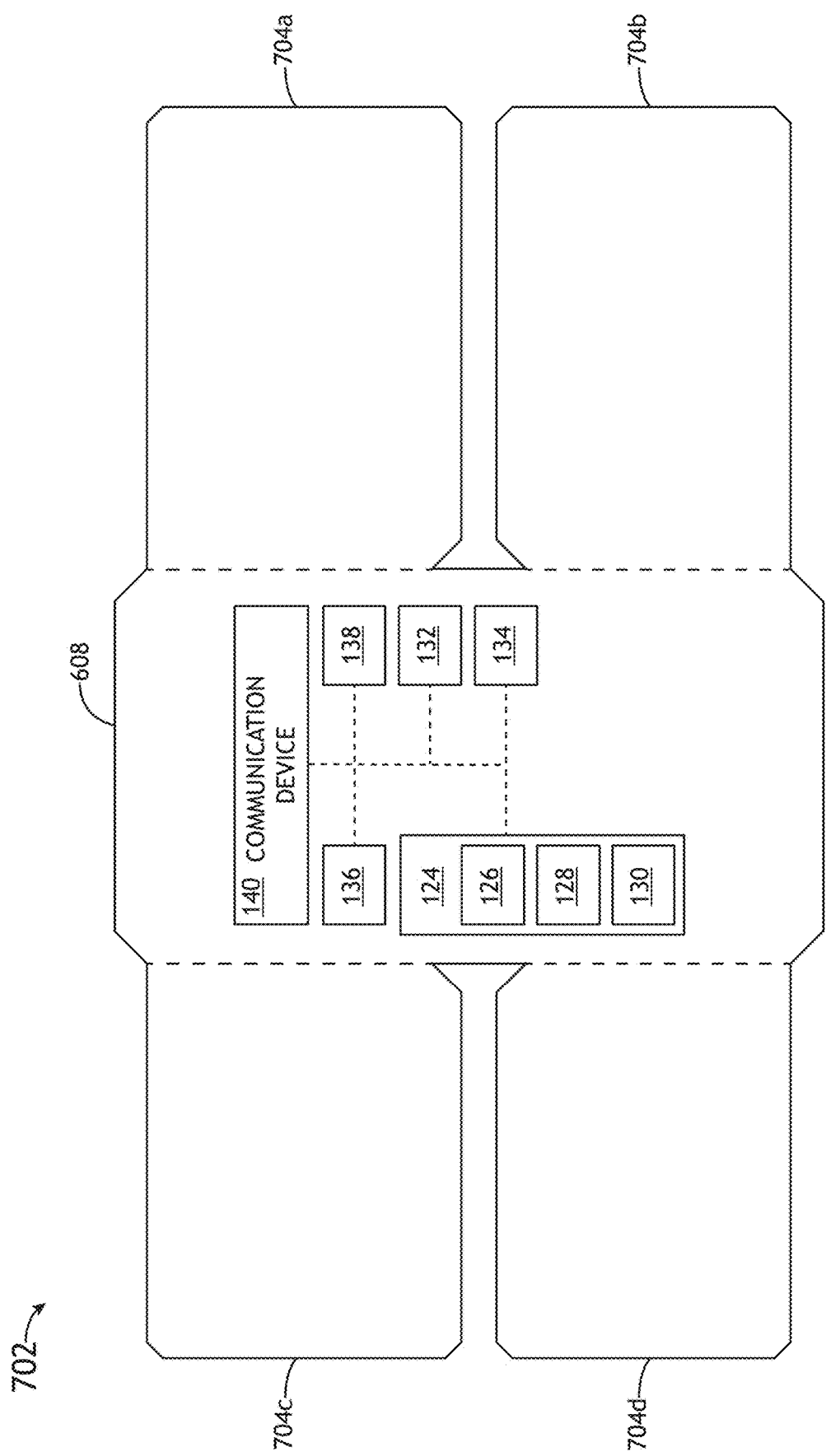
FIG. 7 illustrates components of a sensor node disposed on a printed circuit board, in accordance with one or more embodiments of the present disclosure.

FIG. 7 illustrates components of a sensor node 102 disposed on a printed circuit board 702, in accordance with one or more embodiments of the present disclosure. The printed circuit board 702 may include a base structure 608 and a plurality of flexible wings 704a-704d.

Previous sensor probes, including previous capacitance-style soil moisture probes, have often been constructed using a rigid printed circuit board inserted within metal rings and supported by plastic support structures. Production of these sensor probes required manual assembly of the metal rings and plastic support structures, which is a time consuming and tedious process. Furthermore, this required the metal rings to be manually soldered to the rigid printed circuit board. The end result of this process is a very rigid sensor probe assembly which may be easily cracked or broken when the assembly is inserted into the ground.

Comparatively, FIG. 7 illustrates an alternative configuration for manufacturing a sensor node 102. The configuration illustrated in FIG. 7 may be easier to manufacture, and may produce sensor nodes 102 which are more durable and less susceptible to cracking or breaking. It is noted herein that the configuration illustrated in FIG. 7 may comprise and additional and/or alternative configuration to the configuration illustrated in FIGS. 6A-6E.

In one embodiment, the printed circuit board 702 includes a rigid base structure 608 comprising a printed circuit board (PCB) and one or more flexible wings 704a, 704b, 704c, 704d. As noted previously herein with respect to FIGS. 6A-6B, various components of a sensor node 102 (e.g., one or more sensors 124, one or more processors 132, memory 134, power supply 136, GPS device 138, communication device 140, and the like) may be disposed on a base structure 608. The rigid base structure 608 and flexible wings 704 may be made of any material known in the art including, but not limited to, rigid laminate and flexible laminate, respectively. In one embodiment, the one or more flexible wings 704 are configured to contact the inner surface of a sensor node body 602 in order to safely secure the rigid base structure 608 (e.g., PCB) including the components of the sensor node 102 within the sensor node body 602 as well as to easily position the circuit board with the respective measurement sensors with a certain tolerance with the tube 602. This may be further understood with reference to FIG. 8.

Figure 8:
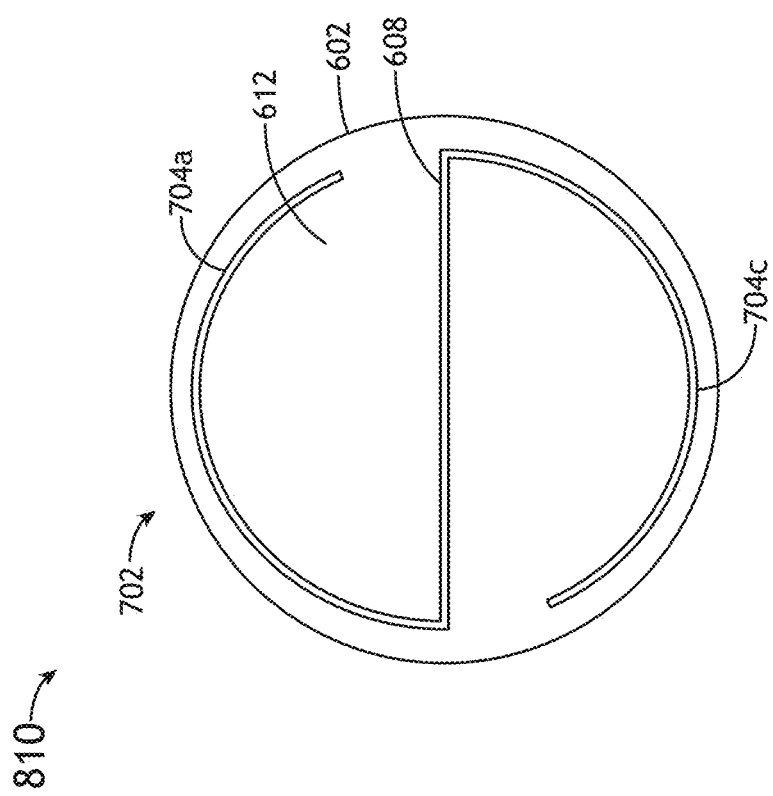
FIG. 8 illustrates cross-sectional view of a printed circuit board with components of a sensor node disposed within a sensor node body, in accordance with one or more embodiments of the present disclosure.

FIG. 8 illustrates a cross-sectional view 810 of a printed circuit board 702 with components of a sensor node 102 disposed within a sensor node body 602, in accordance with one or more embodiments of the present disclosure.

As noted previously herein, sensor node body 602 may include a hollow tube. In one embodiment, as shown in FIG. 8, the flexible wings 704a-704d may be folded or wrapped inwards in order to dispose the printed circuit board 702 within the sensor node body 602. Upon being disposed within the sensor node body 602, the flexible wings 704 may be configured to extend outward, thereby contacting the interior walls of the sensor node body 602 and safely securing the rigid base structure 608 within the center of the sensor node body 602. It is noted herein that the flexible wings 704 may be configured to flex and bend while the printed circuit board 608 is disposed within the sensor node body 602, thereby protecting the components of the sensor node 102 (e.g., one or more sensors 124, one or more processors 132, memory 134, power supply 136, GPS device 138, communication device 140, and the like) from damage as the sensor node body 602 is moved around. In an additional and/or alternative embodiment, as noted herein with respect to FIGS. 6A-6E, a substance such as urethane, acrylic, epoxy, materials with a conformal coating, or an expandable foam may be used to fill the empty volume 612 within the sensor node body 602.

Figure 9:
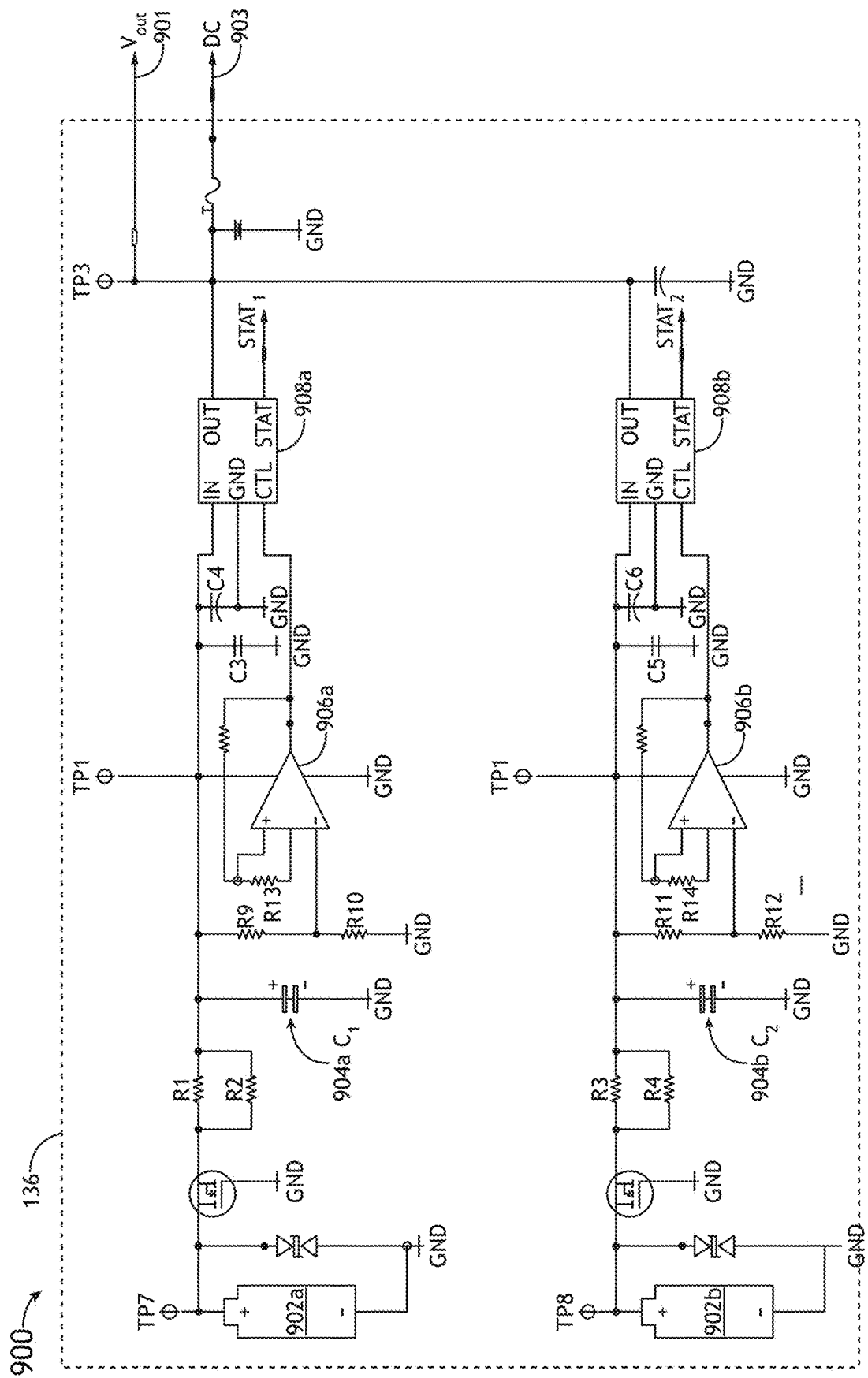
FIG. 9 illustrates a simplified view of an electrical circuit of a power supply for a sensor node, in accordance with one or more embodiments of the present disclosure.

FIG. 9 illustrates a simplified view 900 of an electrical circuit of a power supply 136 for a sensor node 102, in accordance with one or more embodiments of the present disclosure.

In one embodiment, a power supply 136 for a sensor node 102 may include a first battery 902a and a second battery 902b, as shown in FIG. 9. In one embodiment, the batteries 902a, 902b include internal lithium inorganic (D cell) batteries. In one embodiment, the first battery 902a and the second battery 902b may each be configured to provide 20 Ah of electric charge. In one embodiment, the current drawn from the batteries may be limited to 4 mA through $R_1$ and $R_2$ for the first battery 902a, and 4 mA through $R_3$ and $R_4$ for the second battery 902b.

It is noted herein that energy drawn from the one or more power supplies 136 of a sensor node 102 must be monitored and regulated in order to conserve power and prolong the operative life of the sensor node 102. It is further noted herein that a communication device 140 of a sensor node 102 may draw large amounts of current when the transmitting data. For example, a communication device 140 may draw up to 300 mA of current when transmitting data. If this current were drawn directly from the batteries 902a, 902b, the batteries would be quickly drained and the operative life of the sensor nodes 102 would be diminished.

Accordingly, it is contemplated herein that utilizing a combination of batteries 902a, 902b and capacitors may more effectively conserve battery power and prolong the operative life of a sensor node 102. For example, as shown in FIG. 9, a power supply 136 may include a first capacitor 904a and a second capacitor 904b in addition to batteries 902a, 902b. In one embodiment, capacitors 904a, 904b may include lithium ion capacitors. In one embodiment, capacitors 904a, 904b may be configured to store energy in order to more effectively manage power drawn from the batteries 902a, 902b. In this regard, an initial current may be drawn from the batteries 902a, 902b while pre-charging the capacitors 904a, 904b. In one embodiment, during operation, each capacitor 904a, 904b may be configured to supply approximately 1 A of current. It is noted herein that the current which may be provided by each of the capacitors 904a, 904b may be sufficient to power a communication device 140 as well as various other components of sensor node 102 without placing a significant burden on the batteries 902a, 902b.

In another embodiment, power supply 136 includes a first ideal diode 906a and a second ideal diode 906b. The first ideal diode 906a and the second ideal diode 906b may be configured to balance the load between the first capacitor 904a and the second capacitor 904b in order to increase the efficiency of the power source 136. In another embodiment, power supply 136 includes a first comparator 908a and a second comparator 908b configured to monitor the voltage of the batteries 902a, 902b. In another embodiment, the comparators 908a, 908b are configured to identify whether the first battery 902a or the second battery 902b has a low voltage, and disconnect a battery 902a, 902b with a low voltage from the electrical circuit. In another embodiment, once both the first battery 902a and the second battery 902b reach a pre-defined low voltage level, the comparators 908a, 902b are configured to disconnect the first battery 902a and the second battery 902b from the circuit in order to prevent low voltage from being provided to the one or more sensors 124 of the sensor node 102. For example, once the first battery 902a and the second battery 902b fell to 2.5V, the comparators 908a, 902b may be configured to disconnect the first battery 902a and the second battery 902b from the circuit.

It is noted herein that the configuration of a power supply 136 illustrated in FIG. 9 is provided solely for illustration and is not to be regarded as limiting, unless noted otherwise herein. In this regard, additional and/or alternative power supply 136 configurations may be utilized in system 100 without departing from the spirit and scope of the present disclosure. For example, it is contemplated herein that a power supply 136 which utilizes a single battery 902 and a single capacitor 904 in a load-balanced configuration may be used.

Figure 10:
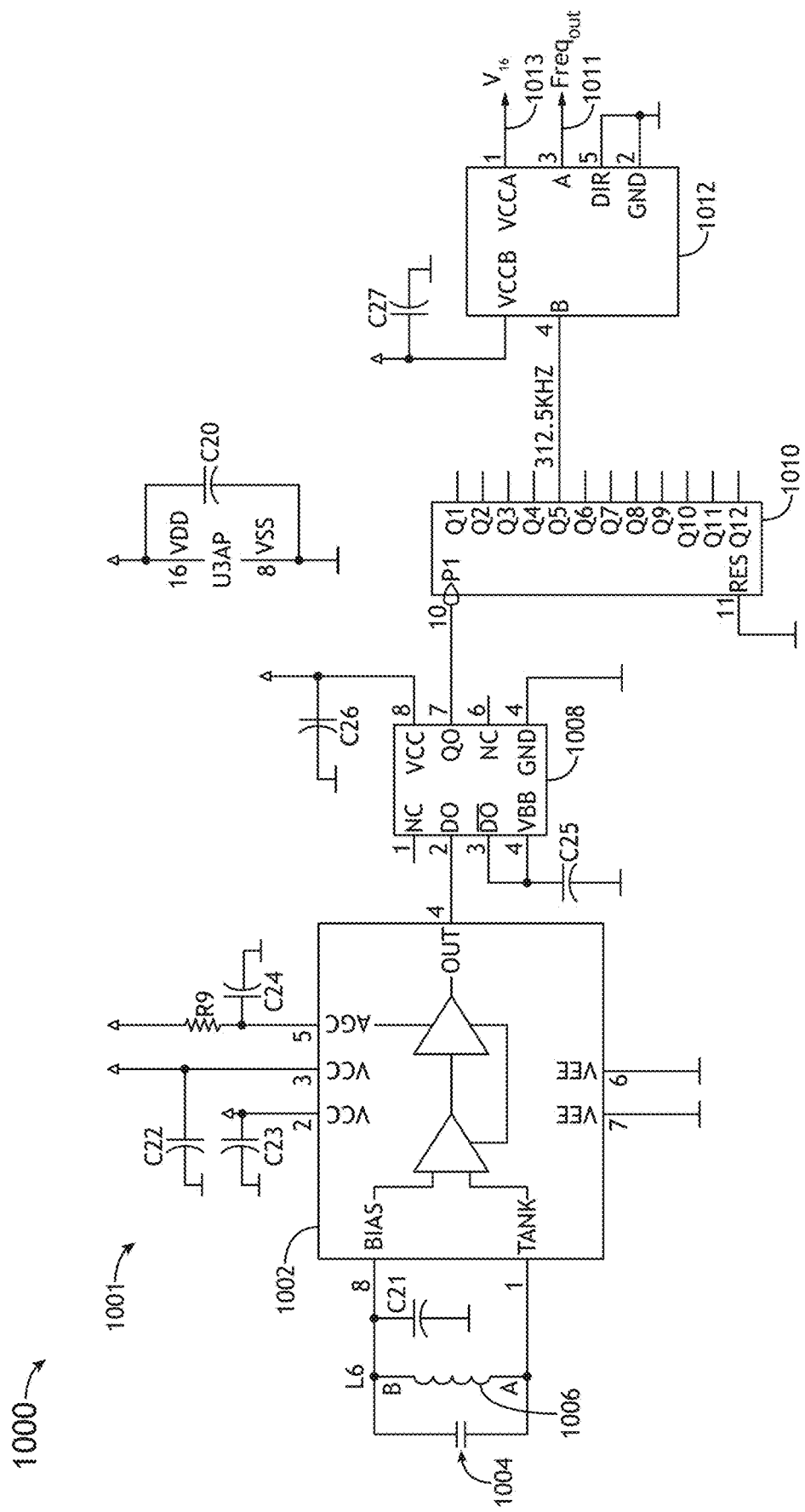
FIG. 10 illustrates a simplified view of an electrical circuit of a capacitive moisture probe.

FIG. 10 illustrates a simplified view 1000 of an electrical circuit of a capacitive moisture probe 1001.

It is noted herein that moisture sensors or probes, including soil moisture probes, may measure variations in resistance and/or capacitance in order to measure the level of moisture in the soil. In particular, capacitive moisture probes may measure variations in capacitances induced by proportional levels of moisture within a volume of soil. For example, capacitive moisture probe 1001 illustrates an capacitive probe which has been utilized in previous capacitive probe approaches. It is contemplated herein that a brief discussion of previous electrical circuit of capacitive moisture probe 1001 may help illustrate inventive concepts of the present disclosure.

Previous soil moisture probes often utilize an oscillator comprising a fixed inductor wired in parallel with a probe capacitor. The probe capacitor may be configured to change capacitance based on the amount of moisture in the soil surrounding the probe capacitor. This inductor and capacitor circuit may be referred to as an "LC circuit." Furthermore, the LC circuit may set the frequency of the oscillator. As the moisture level in the soil surrounding the probe capacitor changes, the capacitance of the probe capacitor may change, thereby changing the frequency of the oscillator. The frequency of the oscillator may subsequently be divided down digitally to a measurable frequency, which may then be converted to a moisture content level using a calibrated capacitance/moisture level formula.

For example, as shown in FIG. 10, capacitive moisture probe 1001 may include a high-frequency tank oscillator 1002 and an LC circuit 1005. The LC circuit may include a probe capacitor 1004 wired in parallel with an inductor 1006. The high-frequency tank oscillator 1002 may exhibit a fixed amplitude output which varies in frequency proportionally to moisture levels in the material surrounding the probe capacitor 1004. In this regard, as the moisture level of the material (e.g., soil) surrounding probe capacitor 1004 changes, the capacitance level of the probe capacitor 1004 may also change. The change in the capacitance of the probe capacitor 1004 may thereby alter the frequency of the LC circuit 1005, and thereby the frequency of the high-frequency tank oscillator 1002.

Capacitive moisture probe 1001 may further include a voltage translator 1008 which is configured to receive the output from the high-frequency tank oscillator 1002 and convert the output into a more useful voltage swing. Electrical circuit 1001 may further include a digital divider 1010 which is configured to divide the frequency into a lower value in order to count the pulses of the output. Finally, capacitive moisture probe 1001 may include a conditioner 1012 which is configured to condition the pulses of the outputs 1013 and 1011 provided to a processor. As noted previously, the processor may then be configured to use a calibrated capacitance/moisture level formula in order to calculate a moisture content level of the soil surrounding the probe capacitor 1004 based on the frequency of the received output.

While the capacitive moisture probe 1001 has been found to effectively measure soil moisture levels, the cost to produce a soil moisture probe utilizing capacitive moisture probe 1001 may be exceedingly high. Furthermore, in order to produce a soil moisture probe which is configured to measure soil moisture levels at multiple depths, each element of capacitive moisture probe 1001 would have to be repeated for each depth at which soil moisture levels are to be measured. This over-complicates moisture probes, and makes them prohibitively expensive to produce.

Figure 11:
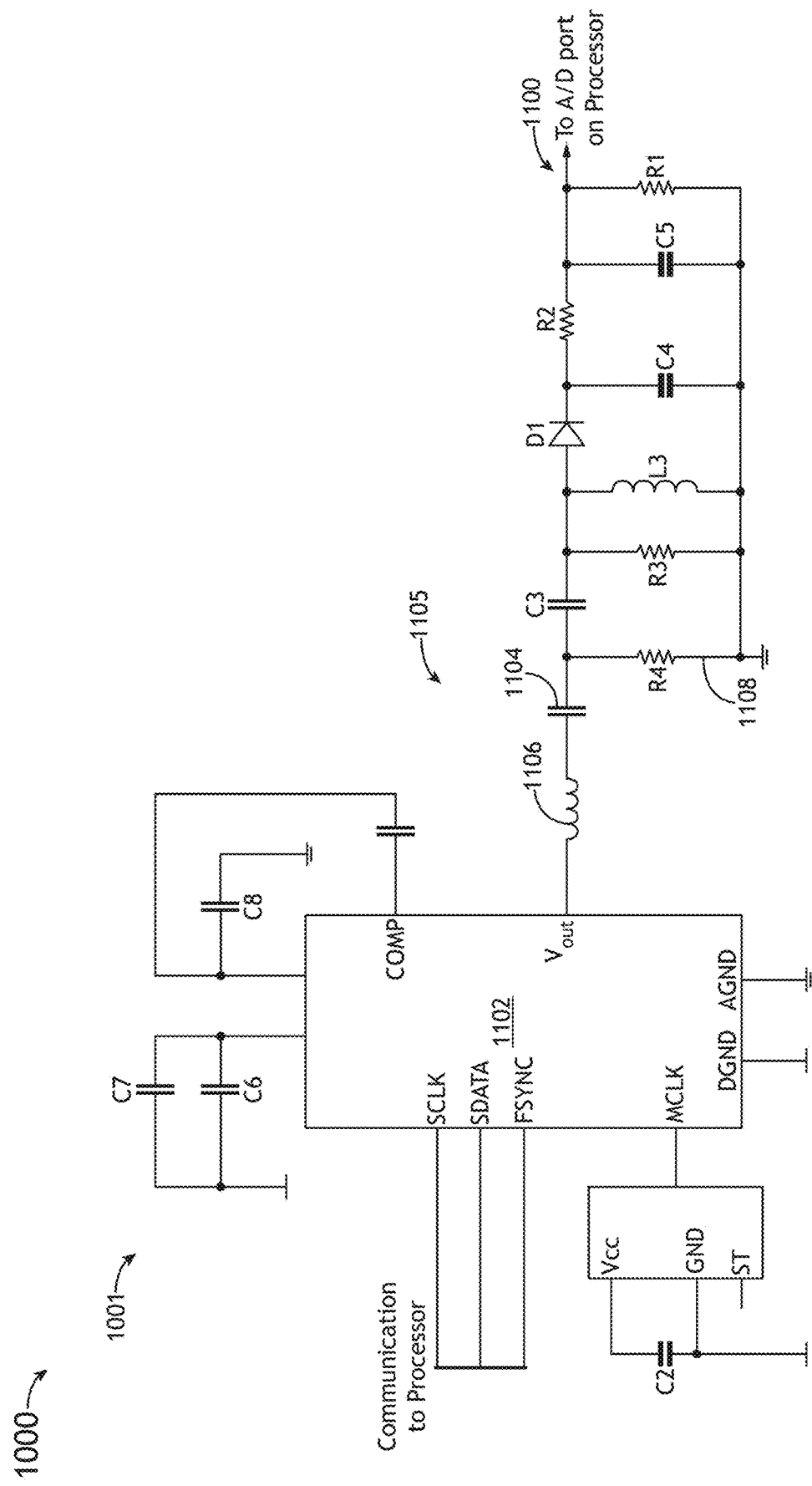
FIG. 11 illustrates a simplified view of an electrical circuit of a capacitive moisture probe for a moisture sensor of a sensor node, in accordance with one or more embodiments of the present disclosure.

FIG. 11 illustrates a simplified view 1100 of an electrical circuit of a capacitive moisture probe 1101 for a moisture sensor 126 of a sensor node 102, in accordance with one or more embodiments of the present disclosure.

It is contemplated herein that the capacitive moisture probe 1101 illustrated in FIG. 11 may resolve many of the shortfalls with the capacitive moisture probe 1001 illustrated in FIG. 10. It is further contemplated herein that the capacitive moisture probe 1101 may be incorporated within a moisture sensor 126 of sensor nodes 102, as illustrated in FIGS. 3A-3B.

In one embodiment, capacitive moisture probe 1101 includes an oscillator 1102, an LC circuit 1105 including a probe capacitor 1104 and an inductor 1106, and a series resistor 1108. The oscillator 1102 may include, but is not limited to, a spectrum-sweep oscillator 1102, a direct digital synthesis oscillator 1102, and the like. In one embodiment, capacitive moisture probe 1101 is configured to measure moisture levels of a material (e.g., soil) located within an area of interest surrounding the probe capacitor 1104.

In one embodiment, the oscillator 1102 is controlled by a processor (e.g., one or more processors 132, or the like) to independently sweep over a determined range of frequencies. As compared to the capacitive moisture probe 1001, within which the frequency of the oscillator 1002 was dependent upon the capacitance in the LC circuit 1005, the frequency of the oscillator 1102 is controlled by a processor and is generated independently of any characteristics of the LC circuit 1105.

In one embodiment, the oscillator 1102 is configured to sweep across a determined range of frequencies until a resonant frequency of the LC circuit 1105 is reached. It is contemplated that the oscillator 1102 may be able to sweep across a wide range of frequencies, and may be able to facilitate variable amplitude levels. For example, oscillator 1102 may be configured to generate frequencies between 0 MHz and 200 MHz at up to 0.6 V peak to peak amplitude. For instance, oscillator 1102 may be configured to generate frequencies between 0 MHz and 12. MHz. In this regard, it is noted herein that the oscillator 1102 may be configured to generate a wider range of frequencies and amplitude levels than that of the oscillator 1002 depicted in FIG. 10. It is further noted herein that increasing the amplitude of the oscillator 1102 output may allow the capacitive moisture probe 1101 to expand the area of interest around the probe capacitor 1104 and measure moisture levels within a larger area of interest. In this regard, the capacitive moisture probe 1101 may be able to measure moisture levels across wider areas of interest than may the capacitive moisture probe 1001 in FIG. 10.

In one embodiment, the output of the oscillator 1102 is directed to the LC circuit 1105 including the inductor 1106 in parallel with the probe capacitor 1104. In another embodiment, the LC circuit 1105 is electrically coupled to a series resistor 1108. In one embodiment, as the oscillator 1102 sweeps across a determined range of frequencies, the oscillator 1102 may reach a resonant frequency of the LC circuit 1105. At the resonant frequency, the magnitude of the impedance of the inductor 1106 will equal the magnitude of the impedance of the probe capacitor 1104. In this regard, as the oscillator 1102 approaches the resonant frequency of the LC circuit 1105, the impedance of the LC circuit 1105 may approach zero ohms. Accordingly, at the resonant frequency, the inductive reactance and the capacitive reactance cancel one another out, resulting in a zero or near-zero ohm value.

In another embodiment, a voltage may be generated across the series resistor 1108 based on the current passing from the LC circuit 1105. Accordingly, the change in impedance at the resonant frequency may be seen by the amplitude of the current across the series resistor 1108.

It is noted herein that an inductor (e.g., inductor 1106) wired in series with a capacitor (e.g., probe capacitor 1104) forms a tank circuit which may be resonant at a particular frequency (e.g., resonant frequency) based upon the inductance of the inductor (e.g., inductor 1106) and the capacitance of the capacitor (e.g., probe capacitor 1104). In this regard, it is further noted herein that soil moisture levels in the area of interest surrounding the probe capacitor 1104 may be determined by analyzing the relationship between the inductor 1106 and the probe capacitor 1104 at the resonant frequency.

In another embodiment, once the resonant frequency of the LC circuit 1105 has been identified, the probe capacitance at the probe capacitor 1104 may be calculated based upon its relationship to the inductance value of the inductor 1106. This relationship may be illustrated in Equation 1:

$$C_{res} = \frac{1}{(2\pi f)^2 L} \quad (1)$$

where capacitance of the probe capacitor 1104 is defined as $C_{res}$, the inductance of the inductor 1106 is defined as L, and the resonant frequency is defined as f.

Once the capacitance $C_{res}$ of the probe capacitor 1104 is found, a processor (e.g., one or more processors 132, and the like) may be configured to convert the capacitance $C_{res}$ into a measured moisture level with a calibrated capacitance/ moisture level formula, as noted previously herein.

It is noted herein that the capacitive moisture probe 1101 may provide a number of advantages over previous capacitive moisture probes. For example, the ability to independently control the frequency of the oscillator 1102 may allow the oscillator 1102 to sweep across a wide range of frequencies and identify resonant frequencies for a wide range of soil types, thereby optimizing the performance of the capacitive moisture probe 1101 for a wide variety of soil types. This may be referred to as spectrum analysis. Furthermore, the ability to increase the amplitude of the output of the oscillator may allow the capacitive moisture probe 1101 to expand the area of interest around the probe capacitor 1104, thereby expanding the volume of material across which moisture levels are determined. Comparatively, the capacitive moisture probe 1001 in FIG. 10 is not able to sweep across a range of frequencies (e.g., is unable to perform spectrum analysis) and is further unable to increase the amplitude of the output of the oscillator 1002.

Additionally, by independently controlling the frequency of oscillator 1102 to identify resonant frequencies for a wide range of soil types, the capacitive moisture probe 1101 within a sensor node 102 may be configured to determine soil types at one or more soil depths, based on capacitance readings and oscillator 1102 frequencies, without having to acquire samples and send samples to a lab for analysis.

It is further contemplated herein that communication between multiple capacitance moisture probes 1101 may allow a system (e.g., system 100) to determine soil types without having to acquire samples and send samples to a lab for analysis. For example, a calibrated capacitive moisture probe 1101a may be installed in the ground a pre-determined distance from an additional capacitive moisture probe 1101b. The calibrated capacitive moisture probe 1101a and the additional capacitive moisture probe 1101b may transmit signals through the ground (e.g., below surface 101) to one another. Based on characteristics of the signals and capacitance readings of the capacitive moisture probe 1101a and the additional capacitive moisture probe 1101b, a system (e.g., system 100) may be able to assign a soil metric or soil coefficient to the material, wherein the soil metric or soil coefficients are indicative of the types of soil and the probability the soil determination is correct. For example, based on the distance between the capacitive moisture probe 1101a and the additional capacitive moisture probe 1101b, as well as the RSSI values of signals between the two, system 100 may be configured to determine a density of the soil, which may be a factor in determining soil metrics and/or soil coefficients.

Figure 12:
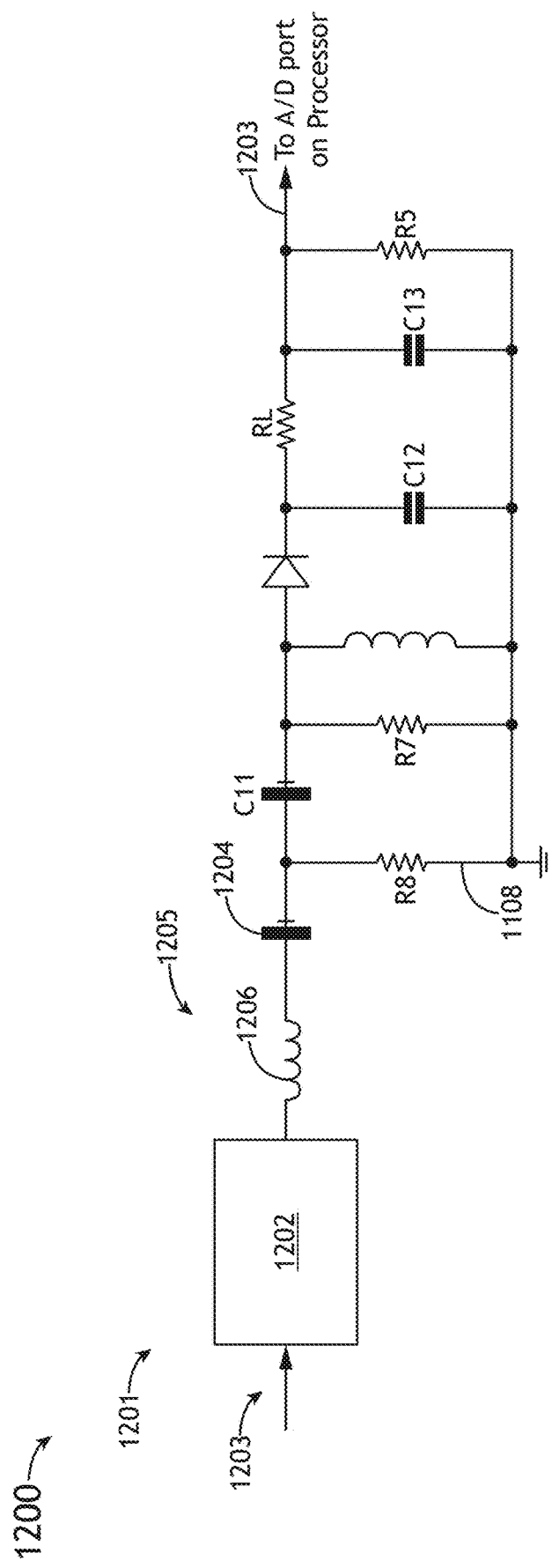
FIG. 12 illustrates a simplified view of an electrical circuit of a capacitive moisture probe for a moisture sensor of a sensor node, in accordance with one or more embodiments of the present disclosure.

FIG. 12 illustrates a simplified view 1200 of an electrical circuit of a capacitive moisture probe 1201 for a moisture sensor 126 of a sensor node 102, in accordance with one or more embodiments of the present disclosure. It is noted herein that, to the extent applicable, any description associated with the capacitive moisture probe 1101 depicted in FIG. 11 may be regarded as applying to the capacitive moisture probe 1201 depicted in FIG. 12, unless noted otherwise herein.

The capacitive moisture probe 1201 depicted in FIG. 12 may comprise a simplified version of the capacitive moisture prove 1101 depicted in FIG. 11. In this regard, it is contemplated that the capacitive moisture probe 1201 may further reduce the production cost of a moisture probe 126 which may be used in sensor node 102. Furthermore, it is contemplated herein that the capacitive moisture probe 1201 may operate in a manner similar to the capacitive moisture probe 1102.

In one embodiment, the capacitive moisture probe 1201 includes an oscillator 1202, an LC circuit 1205 including a probe capacitor 1204 and an inductor 1206, and a series resistor 1208. In another embodiment, the oscillator 1202 is controlled by a processor and is configured to receive square waves from the processor. In another embodiment, the square wave generated by the processor may be converted into a sine wave using a simple filter circuit employing discrete components. It is noted herein that the effectiveness and accuracy of capacitive moisture probe 1201 may be dependent upon the ability of the processor to generate the proper spectrum of square wave frequencies accurately. It is further noted herein that this may be facilitated by the use of a digital signal processor (DSP).

In one embodiment, if the oscillator 1202 outputs a square wave frequency which is not the resonant frequency of the LC circuit 1205 (e.g., tank circuit), a minimum current may flow through series resistor 1208, resulting in a minimum voltage to appear across series resistor 1208. Conversely, as the resonant frequency, the LC circuit 1205 will become resonant and a maximum current may flow through series resistor 1208.

It is further noted herein that the use of square waves and/or a DSP may provide for higher sampling frequencies than may be provided by a spectrum-sweep oscillator (e.g., spectrum-sweep oscillator 1102). In another embodiment, oscillator 1202 may drive multiple LC circuits 1205 at varying depths in order to determine moisture levels at varying depths within a sensor node 102. In this regard, the DC outputs from multiple LC circuits 1205 may be read on individual analog ports of a processor (e.g., one or more processors 132). It is further contemplated herein that one single sweep through a frequency range with the oscillator 1202 may be used to identify the resonant frequency of each individual LC circuit 1205.

Figure 13:
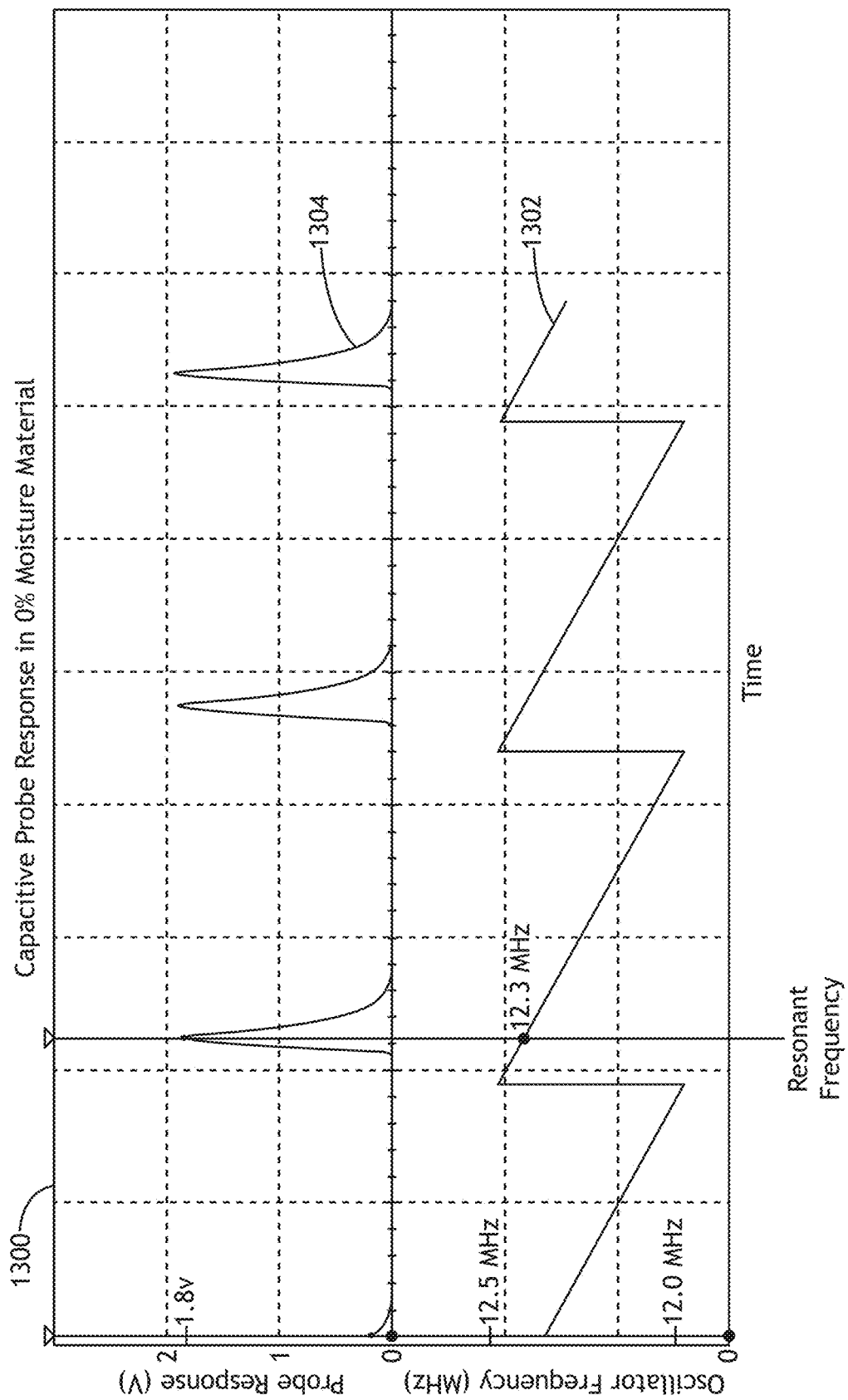
FIG. 13 depicts a graph illustrating a resonant frequency of a capacitive probe in a material with zero moisture level, in accordance with one or more embodiments of the present disclosure.

FIG. 13 depicts a graph 1300 illustrating a resonant frequency of a capacitive probe in a material with zero moisture level, in accordance with one or more embodiments of the present disclosure. More particularly, graph 1300 illustrates a capacitive moisture probe (e.g., capacitive moisture probe 1101) in a material with 0% moisture content (e.g., moisture level of 0%).

The lower trace 1302 illustrates the frequency of the oscillator 1102 over time as the oscillator sweeps through a range of frequencies. For example, as shown in FIG. 13, the lower trace 1302 shows the oscillator 1102 sweeping through a range of 12.5 MHz at the peak to a range of 12.0 MHz at the trough of the saw-tooth trace pattern. Conversely, the upper trace 1304 illustrates the voltage from the capacitive moisture probe in response to the frequency provided by the oscillator 1102 in lower trace 1302. Comparing upper trace 1304 to lower trace 1302, it may be seen that a maximum current (and therefore maximum voltage) flows through the LC circuit at a particular resonant frequency. For example, in FIG. 13, the resonant frequency was reached at approximately 12.3 MHz (lower trace 1302) at which point the probe returned a maximum voltage (at the maximum LC circuit frequency) of approximately 1.8 volts.

Figure 14:
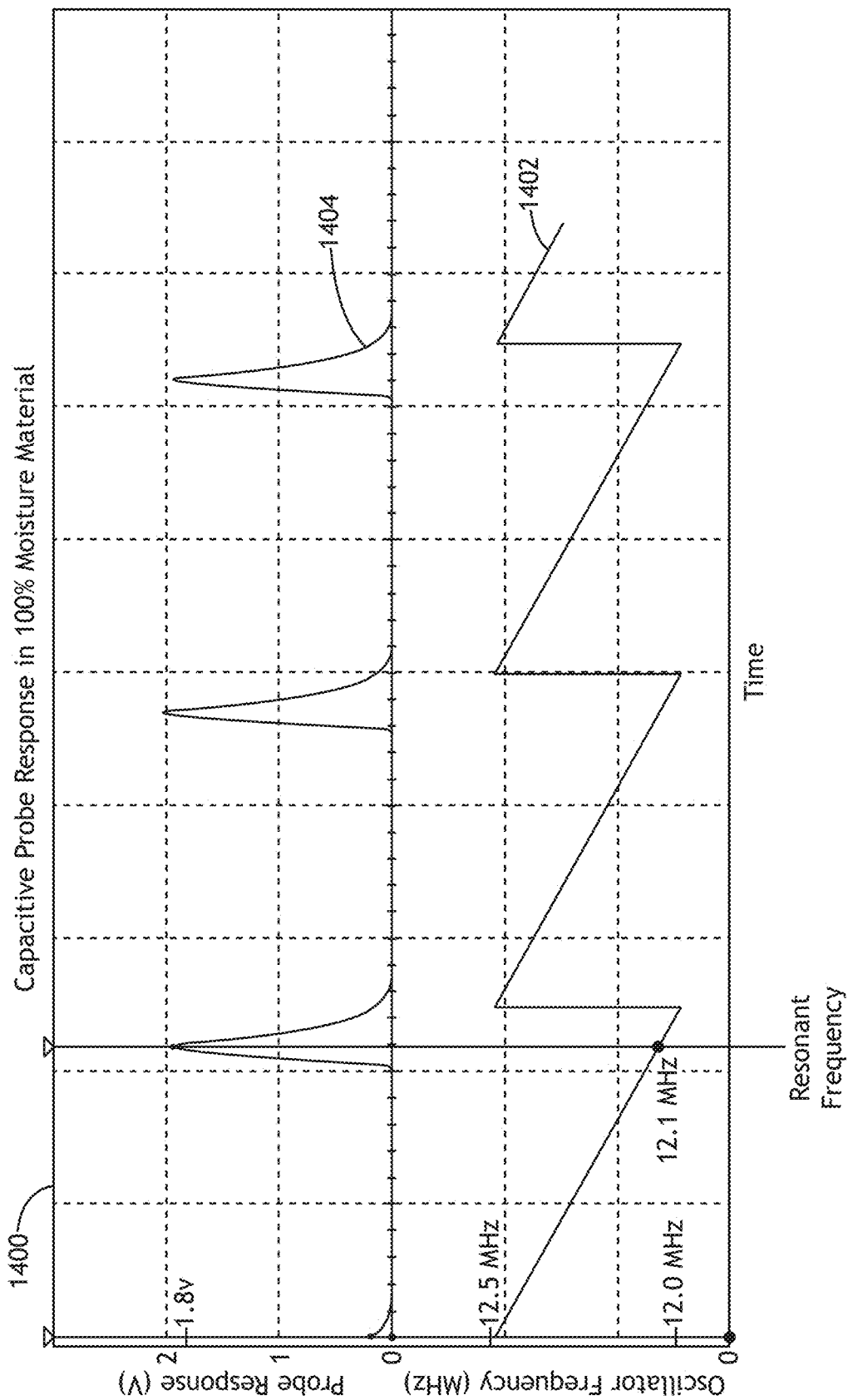
FIG. 14 depicts a graph illustrating a resonant frequency of a capacitive probe in a material with a non-zero moisture level, in accordance with one or more embodiments of the present disclosure.

FIG. 14 depicts a graph 1400 illustrating a resonant frequency of a capacitive probe in a material with a non-zero moisture level, in accordance with one or more embodiments of the present disclosure. More particularly, graph 1300 illustrates a capacitive moisture probe (e.g., capacitive moisture probe 1101) in a material with 100% moisture content (e.g., moisture level of 100%).

Similarly, lower trace 1402 the frequency of the oscillator 1102 over time as the oscillator sweeps through a range of frequencies, and upper trace 1404 illustrates the voltage from the capacitive moisture probe in response to the frequency provided by the oscillator 1102 in lower trace 1302. Comparing graph 1300 and graph 1400, it may be seen that the resonant frequency in a 0% moisture environment is approximately 12.3 MHz, whereas the resonant frequency in a 100% moisture level environment is approximately 12.1 MHz. In this regard, it may be seen that varying levels of moisture content may correspond to varying resonant frequencies. From the resonant frequency of each particular soil, capacitance may then be determined, which may then be used to identify moisture levels.

Figure 15:
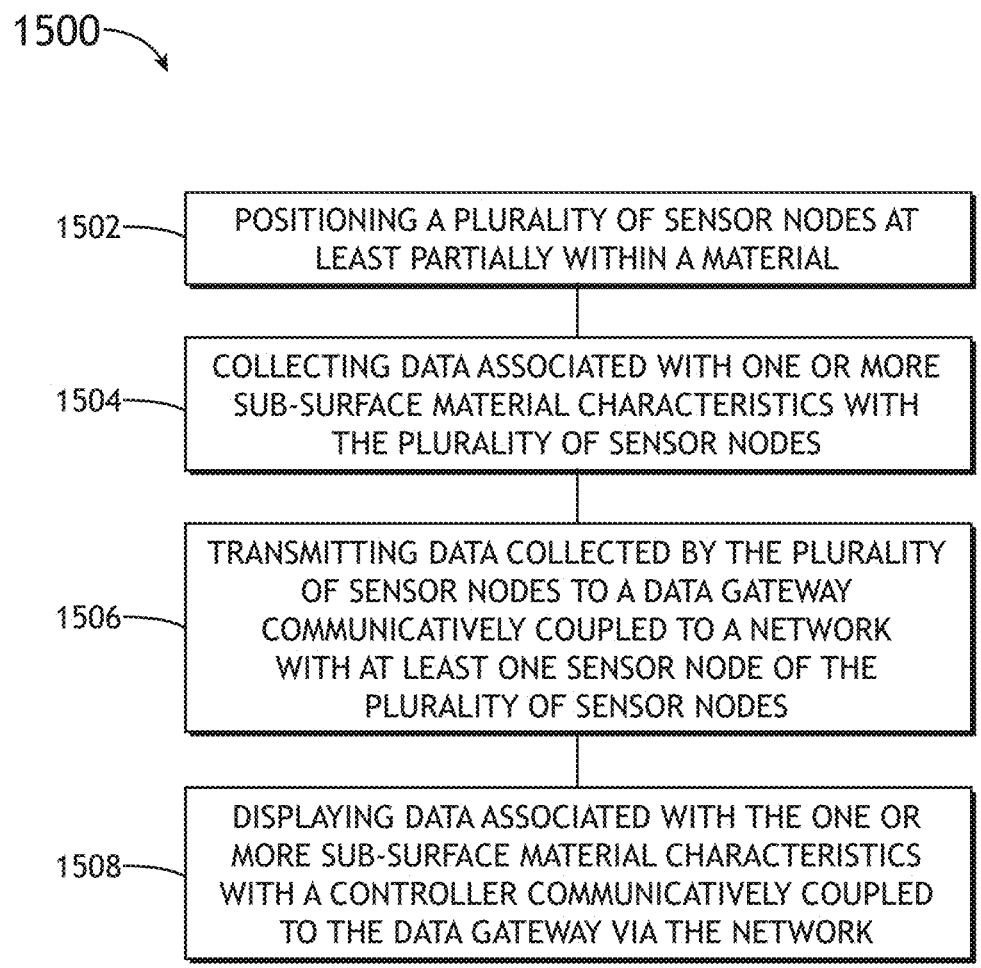
FIG. 15 illustrates a flowchart of a method for collecting data associated with one or more sub-surface characteristics of a material, in accordance with one or more embodiments of the present disclosure.

FIG. 15 illustrates a flowchart of a method 1500 for collecting data associated with one or more sub-surface characteristics of a material, in accordance with one or more embodiments of the present disclosure. It is noted herein that the steps of method 1500 may be implemented all or in part by system 100. It is further recognized, however, that the method 1500 is not limited to the system 100 in that additional or alternative system-level embodiments may carry out all or part of the steps of method 1500.

In a step 1502, a plurality of sensor nodes are positioned at least partially within a material. For example, as illustrated in FIG. 1A, the plurality of sensor nodes 102 may include one or more sub-surface sensor nodes 102a-102f and one or more surface sensor nodes 102g-102h. As noted previously herein, the material may include, but is not limited to, soil, concrete, compost, sand, volumes of commodities (e.g., grain, wheat, corn, potatoes, sugar beets, DDG, and the like), biomass, landfill material, and the like.

In a step 1504, data associated with one or more sub-surface material characteristics is collected with the plurality of sensor nodes. For example, as shown in FIGS. 3A-3B, each sensor node 102 of a plurality of sensor nodes 102 may include one or more sensors 124. The one or more sensors 124 may include any sensors known in the art configured to collect data associated with one or more sub-surface material characteristics. For example, the one or more sensors 124 may include, but are not limited to, one or more moisture sensors 126, one or more temperature sensors 128, one or more electroconductivity sensors 130, one or more pressure sensors, one or more chemical composition sensors, one or more nutrient sensors, one or more accelerometer sensors and the like. It is further contemplated herein that data associated with the one or more sub-surface material characteristics may be collected at varying depths relative to the surface 101 of the material.

In a step 1506, data collected by the plurality of sensor nodes is transmitted to a data gateway communicatively coupled to a network with at least one sensor node of the plurality of sensor nodes. For example, as shown in FIG. 1A, data collected by the sensor nodes 102a-102h is transmitted to a data gateway 104 which is communicatively coupled to a network 106. The data is transmitted to the data gateway 104 by sensor node 102*g* and sensor node 102*h*.

In a step 1508, data associated with the one or more sub-surface material characteristics is displayed with a controller. For example, referring to FIG. 1A, a controller 114 may be communicatively coupled to the data gateway 104 via a network 106. The controller 114 may be configured to receive data collected by the plurality of sensor nodes 102*a*-102*h* from the data gateway 104. The controller 114 may be further be configured to display the collected data associated with one or more sub-surface material characteristics via a display 122 of a user interface 120 communicatively coupled to the controller 114.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system, comprising:
   a plurality of sensor nodes, each sensor node of the plurality of sensor nodes comprising:
   a power supply; and
   a communication device,
   wherein the plurality of sensor nodes includes one or more underground sensor nodes positioned below the surface of a material,
   wherein the plurality of sensor nodes includes one or more partially-exposed sensor node positioned partially below the surface of the material and partially above the surface of the material,
   wherein the plurality of sensor nodes further include one or more sensors positioned below the surface of a material to collect data regarding one or more sub-surface material characteristics, wherein the one or more sensors are located in at least some of the one or more underground sensor nodes or the one or more partially-exposed sensor nodes;
   a data gateway communicatively coupled to the plurality of sensor nodes via one or more wireless transmission pathways, wherein the data gateway is configured to:
   receive the data collected by the one or more sensors; and
   store the data collected by the one or more sensors; and
   a controller communicatively coupled to the gateway, wherein the controller is configured to:
   receive the data from the one or more sensors from the data gateway; and
   display at least a portion of the data associated with at least one of the one or more sub-surface material characteristics.

2. The system of claim 1, wherein the one or more sensors are located exclusively in the one or more underground sensor nodes.

3. The system of claim 1, wherein at least some of the one or more sensors are located in at least one of the one or more partially-exposed sensor nodes.

4. The system of claim 1, wherein at least one of the one or more transmission pathways comprises:
   a transmission pathway directly between one of the one or more partially-exposed sensor nodes and the data gateway.

5. The system of claim 1, wherein at least one of the one or more transmission pathways comprises:
   a transmission pathway directly between one of the one or more underground sensor nodes and the data gateway.

6. The system of claim 1, wherein at least one of the one or more transmission pathways comprises:
   a transmission pathway between a first sensor node of the plurality of sensor nodes and the data gateway through one or more additional sensor nodes of the plurality of sensor nodes.

7. The system of claim 6, wherein the one or more additional sensor nodes of the plurality of sensor nodes are configured to forward data received from the first sensor node.

8. The system of claim 7, wherein the one or more additional sensor nodes of the plurality of sensor nodes are further configured to store the data received from the first sensor node.

9. The system of claim 6, wherein the one or more additional sensor nodes of the plurality of sensor nodes comprises:
   at least one of the one or more underground sensor nodes.

10. The system of claim 6, wherein the one or more additional sensor nodes of the plurality of sensor nodes comprises:
    at least one of the one or more partially-exposed sensor nodes.

11. The system of claim 6, wherein the one or more additional sensor nodes of the plurality of sensor nodes comprises:
    at least one of the one or more underground sensor nodes and at least one of the one or more partially-exposed sensor nodes.

12. The system of claim 1, wherein the controller is further configured to transmit one or more signals to at least one sensor node of the plurality of sensor nodes, the one or more signals configured to adjust one or more characteristics of the at least one sensor node.

13. The system of claim 1, further comprising one or more operational devices, wherein the controller is further configured to adjust one or more characteristics of at least one operational device in response to the data collected by the one or more sensors.

14. The system of claim 1, wherein the controller is further configured to:
    receive data collected by satellite imagery; and
    display at least a portion of the data associated with at least one of the one or more sub-surface material characteristics supplemented by the data collected by satellite imagery.

15. The system of claim 1, wherein at least one of the plurality of sensors includes the communication device and at least one of the one or more sensors in a common housing.

16. The system of claim 1, wherein at least one of the plurality of sensors includes the communication device in a first housing and at least one of the one or more sensors in a second housing, wherein the first and second housings are communicatively coupled with at least one of a wired or wireless connection.

17. The system of claim 1, wherein the material comprises at least one of soil, grain, concrete, biomass, sand, compost, volumes of commodities, liquids, and landfill material.

18. The system of claim 1, wherein at least one of the one or more sensors comprises an electroconductivity sensor configured to collect data regarding an electrical conductivity level of the material.

19. The system of claim 1, wherein at least one of the one or more sensors comprises a temperature sensor configured to collect data regarding a temperature of the material.

20. The system of claim 1, wherein the one or more sensors include a first temperature sensor and a second temperature sensor, wherein the first temperature sensor is configured to collect data regarding a first temperature level of the material at a first depth, and the second temperature sensor is configured to collect data regarding a second temperature level of the material at a second depth different from the first depth.

21. The system of claim 1, wherein at least one of the one or more sensors comprises a moisture sensor configured to collect data regarding a moisture level of the material.

22. The system of claim 21, wherein the moisture sensor comprises:
    an LC circuit
    an oscillator; and
    a processor, wherein the processor is configured to cause the oscillator to provide a current to the first LC circuit, wherein the processor is further configured to determine the first moisture level of the material located in the first area of interest.

23. The system of claim 1, wherein the one or more sensors include a first moisture sensor and a second moisture sensor, wherein the first moisture sensor is configured to collect data regarding a first moisture level of the material at a first depth, and the second moisture sensor is configured to collect data regarding a second moisture level of the material at a second depth different from the first depth.

24. The system of claim 1, wherein the data gateway is configured to transmit stored data to the controller via a network.

25. The system of claim 1, wherein the power supply comprises:
    one or more batteries;
    one or more capacitors, wherein the one or more capacitors are configured to store energy from the one or more batteries, wherein the one or more capacitors are further configured to provide power to the communication device.

26. The system of claim 25, wherein the one or more capacitors include two or more capacitors, wherein the power supply further comprises:
    two or more diodes to balance a load between the two or more capacitors.

* * * * *